US012476577B2

(12) United States Patent
Almy et al.

(10) Patent No.: US 12,476,577 B2
(45) Date of Patent: Nov. 18, 2025

(54) TRUSS FOUNDATIONS FOR FROST-HEAVE AND OTHER REACTIVE SOIL ENVIRONMENTS

(71) Applicant: Ojjo, Inc., San Rafael, CA (US)

(72) Inventors: Charles Almy, Berkeley, CA (US); Greg McPheeters, Santa Cruz, CA (US); Emma Tam, Petaluma, CA (US)

(73) Assignee: OJJO, INC., San Rafael, CA (US)

( * ) Notice: Subject to any disclaimer, the term of this patent is extended or adjusted under 35 U.S.C. 154(b) by 0 days.

(21) Appl. No.: 18/439,091

(22) Filed: Feb. 12, 2024

(65) Prior Publication Data

US 2024/0213911 A1 Jun. 27, 2024

Related U.S. Application Data

(63) Continuation-in-part of application No. 17/187,488, filed on Feb. 26, 2021, now Pat. No. 12,021,483.

(60) Provisional application No. 62/982,080, filed on Feb. 27, 2020.

(51) Int. Cl.
*F16M 11/00* (2006.01)
*F16M 11/10* (2006.01)
*F16M 11/18* (2006.01)
*H02S 20/32* (2014.01)

(52) U.S. Cl.
CPC ............. *H02S 20/32* (2014.12); *F16M 11/10* (2013.01); *F16M 11/18* (2013.01)

(58) Field of Classification Search
None
See application file for complete search history.

(56) References Cited

U.S. PATENT DOCUMENTS

| | | | |
|---|---|---|---|
| 3,630,037 A | 12/1971 | Howard | |
| 4,478,234 A * | 10/1984 | Bester | E04H 15/48 135/93 |
| 11,505,943 B2 * | 11/2022 | Almy | F24S 30/425 |
| 2011/0186040 A1 | 8/2011 | Liao | |
| 2013/0048582 A1 * | 2/2013 | Kruse | F24S 30/425 29/897.31 |
| 2016/0060838 A1 | 3/2016 | El Naggar et al. | |
| 2016/0329860 A1 * | 11/2016 | Kalus | H02S 20/10 |
| 2018/0051915 A1 * | 2/2018 | Rainer | F24S 25/10 |
| 2018/0087231 A1 * | 3/2018 | Masula | E02D 27/50 |
| 2020/0032830 A1 | 1/2020 | Hudson et al. | |
| 2020/0072505 A1 * | 3/2020 | Hudson | H02S 20/10 |

(Continued)

FOREIGN PATENT DOCUMENTS

JP 6430721 B2 11/2018

OTHER PUBLICATIONS

International Searching Authority, "International Preliminary Report on Patentability and Written Opinion", From Application No. PCT/US2021/020088, Mailed Sep. 9, 2022, pp. 10.

(Continued)

*Primary Examiner* — Steven M Marsh
(74) *Attorney, Agent, or Firm* — Fredrikson & Byron, P.A.

(57) ABSTRACT

A truss foundation for single-axis trackers that are installed in climates that experience frost heave or reactive soils. Truss legs are oriented to be substantially plumb, to eliminate adfreeze moment on below-ground components in the frost zone. Elbow couplers are attached to the upper end of each embedded component and used to change the leg angle from plumb to angled.

13 Claims, 25 Drawing Sheets

(56) References Cited

U.S. PATENT DOCUMENTS

| | | |
|---|---|---|
| 2020/0076354 A1* | 3/2020 | West .................... F24S 25/13 |
| 2020/0076355 A1* | 3/2020 | Hudson ................ F24S 25/70 |
| 2020/0116394 A1* | 4/2020 | West .................... F24S 25/13 |
| 2020/0304060 A1* | 9/2020 | Hudson ................ H02S 20/32 |
| 2021/0138595 A1* | 5/2021 | Hudson ............... F24S 25/617 |

OTHER PUBLICATIONS

European Patent Office, "Extended European Search Report", From Application No. 21760957.7, Dated Jun. 28, 2024, pp. 10.

* cited by examiner

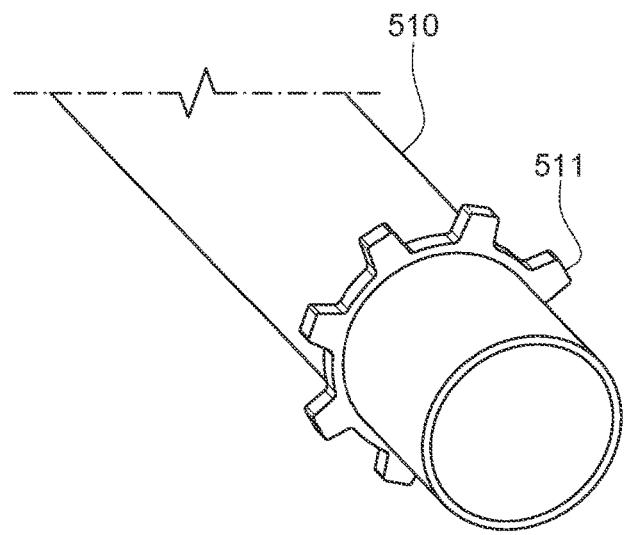
FIG. 12
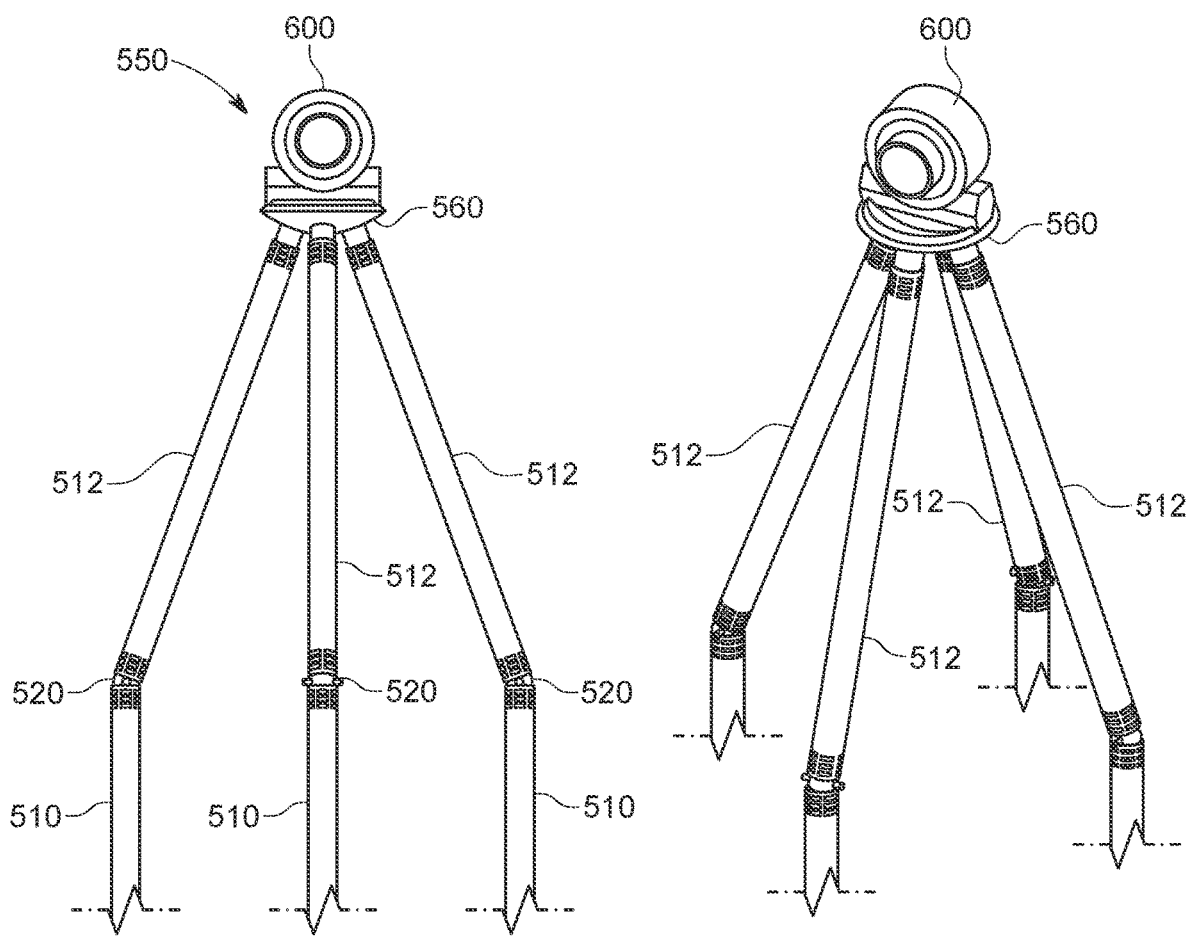
FIG. 13A
FIG. 13B

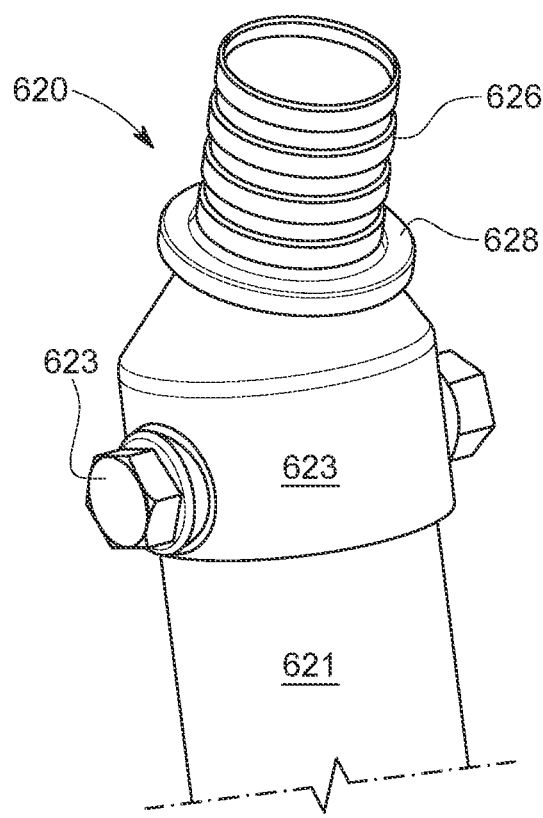
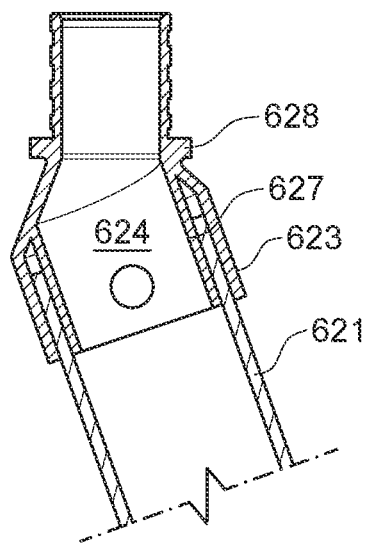
FIG. 21A
FIG. 21B
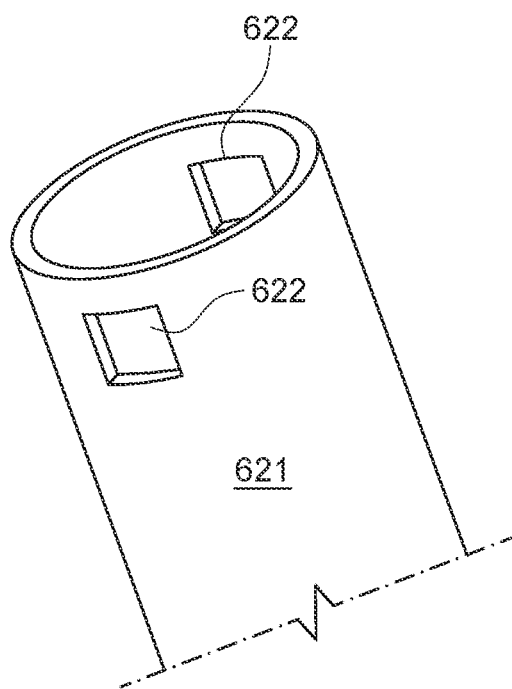
FIG. 21C

TRUSS FOUNDATIONS FOR FROST-HEAVE AND OTHER REACTIVE SOIL ENVIRONMENTS

CROSS-REFERENCE TO RELATED APPLICATIONS

This is a continuation-in-part of U.S. Utility patent application Ser. No. 17/187,488 filed on Feb. 26, 2021, titled "Truss foundations for frost-heave environments," which claims priority to U.S. provisional patent application No. 62/982,080 filed on Feb. 27, 2020, titled "Single-axis tracker foundations", the disclosures of which are hereby incorporated by reference in their entirety.

BACKGROUND

Single-axis trackers have become the most popular form factor for so-called utility scale solar arrays. These systems consist of rows of solar panels attached to North-South oriented torque tubes that move slowly from an East-facing to West-facing orientation through the course of each day to keep the panels perpendicular to radiation from the sun. These structures are typically supported by rows of ground penetrating foundations. Historically, wide-flange steel beams known as H-piles were used to support single-axis trackers. However, more recently, the Applicant of this disclosure has introduced an A-frame-shaped truss foundation for single-axis trackers to the utility-scale marketplace as a cost-saving alternative to H-piles. Known commercially as EARTH TRUSS, this system relies on a pair of adjacent angled legs that form a truss with the ground.

When supporting single-axis trackers, truss foundations offer several advantages over conventional H-piles because they convert lateral loads into axial forces of tension and compression, rather than into bending moments. This enables the tracker to be supported with less steel and enables the below-ground components to be driven to shallower embedment depths than required for H-piles. Shallower embedment depths result in fewer refusals, thereby avoiding an expensive and time-consuming refusal mitigation process. Also, with the hollow, open-ended geometry of EARTH TRUSS components, it is possible to actuate a drilling tool through the screw anchor while it is driven into the ground, thereby speeding workflow relative to pre-drilling.

Despite their advantages, there are some climates where H-piles may outperform truss foundations. As the price of solar panels has dropped well below one dollar per watt, utility-scale solar arrays are being built in latitudes not previously cost effective for solar. Northern latitudes typically experience sustained sub-zero temperatures during the winter, which can be disruptive to foundations. The phenomena known as frost heave occurs where moisture in the portion of the soil from grade down to the frost line freezes, causing the ground to heave upwards. This can be disruptive to any foundation that does not extend below the frost line. This is especially true when the foundation components are oriented at an angle with respect to plumb. Sub-surface ice in contact with such components will tend to pull them upwards, applying a moment to the foundation. Where the depth of frost zone is substantial (i.e., multiple feet), such a moment may destroy or at least compromise the foundation. A similar phenomena may also occur in reactive clay soils that expand and contract due to seasonal changes in the moisture content of the clay that puts upward pressure on the truss foundation. To prevent this, various embodiments of the invention provide truss foundations that are optimized for use in climates that are subject to substantial frost heave during winter and/or to expansion and contraction due to changes in moisture content.

BRIEF DESCRIPTION OF THE DRAWINGS

FIG. 12 shows an exemplary collarless screw anchor usable with various embodiments of the invention;

FIGS. 13A and 13B are front and perspective views respectively of a multi-leg truss foundation supporting a tracker drive motor according to various exemplary embodiments;

FIGS. 21A and 21B are side and cut-away views respectively of another exemplary one-piece elbow coupler according to various embodiments of the invention;

FIG. 21C is a perspective view of the upper end of a foundation component usable with the one-piece coupler of FIGS. 21A-B;

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

As mentioned in the background, single-axis trackers have traditionally been supported by monopiles, that is, rows of individual H-pile foundations. To compete with conventional H-piles, the Applicant of this disclosure introduced an A-frame-shaped truss foundation to the utility-scale solar marketplace known commercially as EARTH TRUSS. EARTH TRUSS consists of a pair of angled truss legs, extending below and above ground that are joined at their above ground ends with an adapter, truss cap or bearing adapter. This adapter, truss cap, or bearing adapter completes the A-frame-shaped structure and may provide a mounting surface to support a tracker component such as a bearing assembly or drive motor.

Figure 1A:
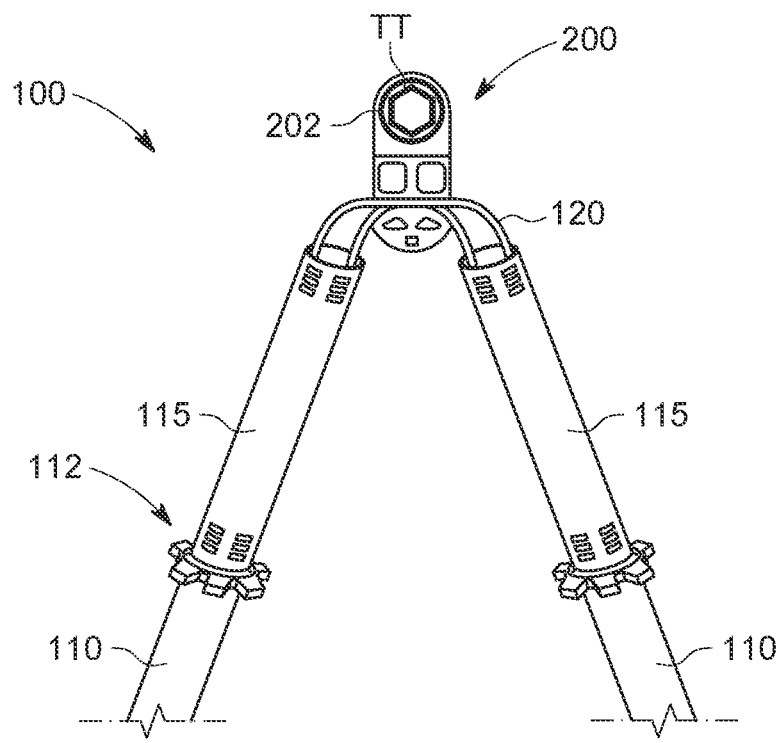
FIG. 1A shows truss foundation supporting a portion of a single-axis tracker in accordance with various embodiments of the invention.
Figure 1B:
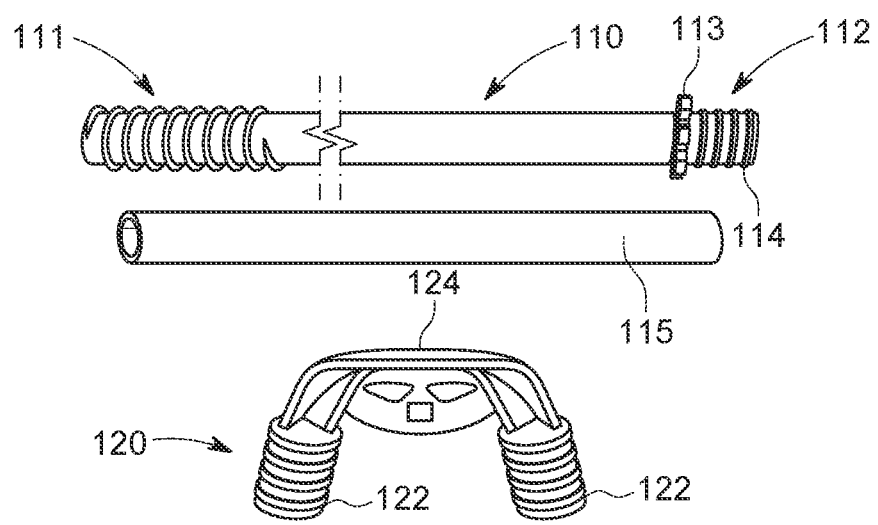
FIG. 1B shows components used to make the truss foundation of FIG. 1.

Turning to the Figures, FIG. 1A shows EARTH TRUSS foundation 100 in accordance with various embodiments of the invention while FIG. 1B shows the individual components used to construct it. Truss foundation 100 is made of a pair of adjacent angled truss legs extending into underlying ground that are joined at the apex by truss cap or adapter 120. In this example, truss cap 120 is supporting single-axis tracker bearing assembly 200. Bearing assembly 200 is analogous to bearing assemblies used in the DuraTrack HZ NX Series of single-axis trackers manufactured and sold by Array Technology, Inc. of Albuquerque, NM. In such a tracker, the torque tube, labeled "TT" in the figures, is seated within bearing 202 and rotates about its own axis.

Each truss leg of truss foundation 100 consists of screw anchor 110 and upper leg portion 115. Screw anchor 110 is a section of elongated, hollow, galvanized steel tube (e.g., 1-2 meters) with external thread form 111 as its lower end and driving coupler 112 at the upper end. Driving coupler 112 is welded or otherwise attached to the upper end and includes driving features 113 that are engage by the chuck of a rotary driver, and, connecting portion 114 that extends away from the driving features. Connecting portion 114 is received in the open lower end of upper leg portion 115. Connecting portion 114 has a series of channels formed in it that provide recesses to deform upper leg 115 into when a crimping tool is applied to the portion of the upper leg that overlaps with it. Driving features 113 circumscribing coupler 112 act as a stop to limit the extent to which connecting portion 114 of coupler 112 extends into the upper leg.

In various embodiments, truss 100 is assembled with the assistance of a machine that is capable of driving the pair of adjacent screw anchors 110 at angles to one another on either side of an intended North-South tracker row. Then, truss cap 120 is held at the proper orientation, in some embodiments by a jig, holder or other device on the machine, to match the position and orientation of other truss caps in the same row. With the truss cap in place, upper leg portions 115 are sleeved over connecting portions 122 of truss cap 120 and over connecting portion 114 of coupler 112 at the head of screw anchor 110. Then, in various embodiments, a hydraulic crimping device is placed over the overlapping portions of upper leg 115 to deform it into the recesses formed in connecting portions 122 and 114. For a more thorough discussion of the machine see commonly assigned and co-pending U.S. patent application Ser. No. 17/095,616. For a discussion of assembling trusses with a hydraulic crimper, see commonly assigned and co-pending U.S. patent application Ser. No. 17/152,622. The disclosures applications Ser. Nos. 17/095,616 and 17/152,622 are hereby incorporated by reference in their entirety.

Figure 2B:
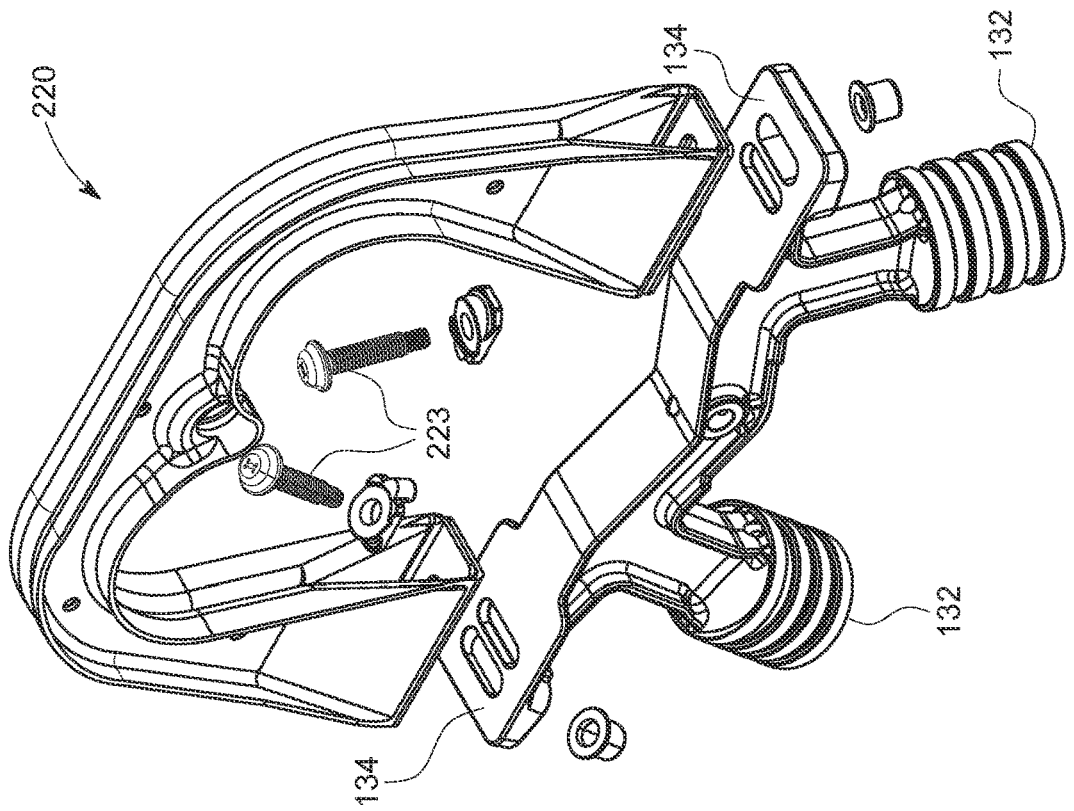
FIGS. 2A and 2B show front and perspective views of a truss cap and bearing housing assembly in accordance with various embodiments of the invention.
Figure 2A:
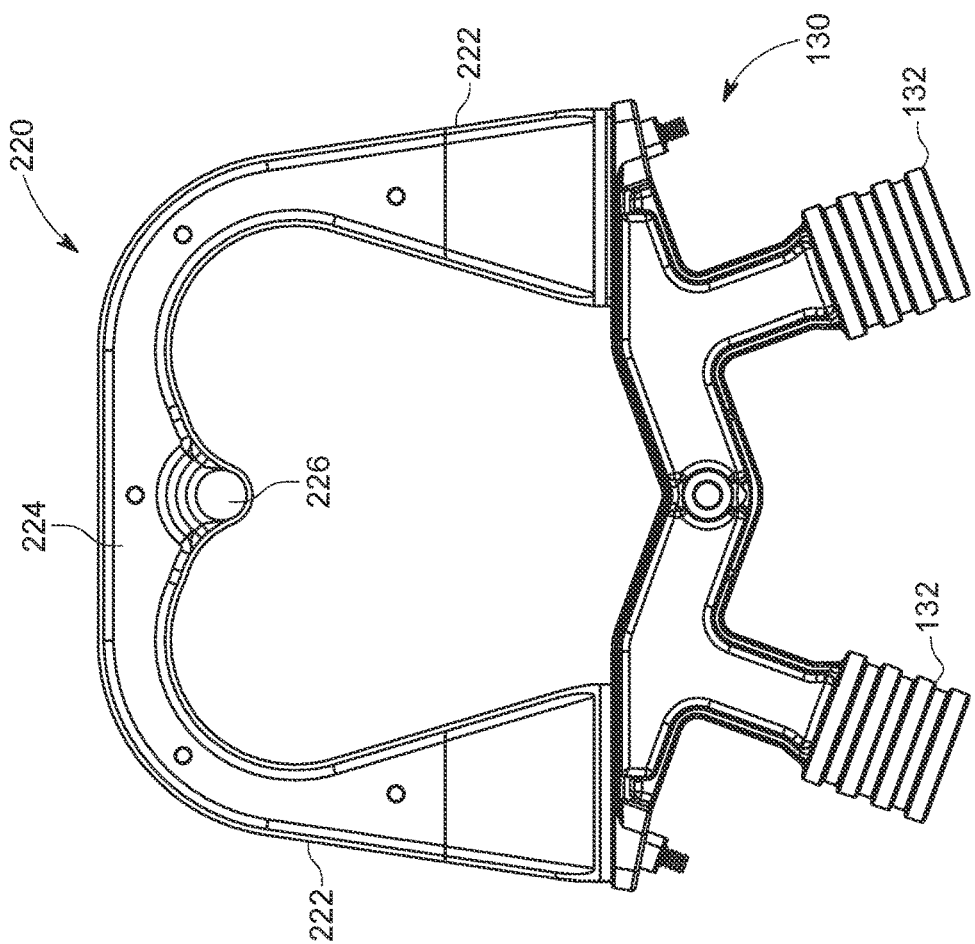

Turning to FIGS. 2A and 2B, these figures show another truss cap 130 that is particular designed to support bearing housing assembly 220. Like truss cap 120 in FIGS. 1 and 2, truss cap 130 joins the free ends of the pair of adjacent truss legs with a pair of connecting portions 132 that are received in each upper leg portion 115. However, unlike truss cap 120, truss cap 130 has a pair of support portions 134 designed to support tracker bearing housing assembly (BHA) 220. BHA 220 is a component of the NX Horizon single-axis tracker from NEXTracker, Inc. of Fremont, CA. NEXTracker's single-axis tracker is a top down or so-called mechanically balanced tracker where the torque tube hangs from a pin through their bearing housing assembly and swings through an arc that is bounded by the bearing housing assembly. A torque tube bracket is attached to the pin and to the torque tube. The drive motor in this tracker is offset so that its axis of rotation is aligned with the bearing pin rather than with the torque tube. The tube curves up on either side of the motor to pass through the slewing drive's gear assembly. According to NEXTracker, this configuration is mechanically balanced so that there are no overturning moments regardless of the angle of the panels. Rather than rotating about its own axis, the torque tube in the NEXTracker single-axis tracker hangs from a pin seated in bearing 226 proximate to custom 224 of NEXTracker's cardioid-shaped BHA 220. Legs 222 and cusp 224 define a space that bounds the arc that torque tube TT is able to swing through as the tube is moved each day. The drive motor in such a tracker is offset so that the rotational axis of the tracker is the bearing pin rather than the torque tube. The various embodiments of the invention are applicable to either the ATI or NEXTracker style of single-axis trackers as well as various other trackers available in the marketplace.

Figure 3:
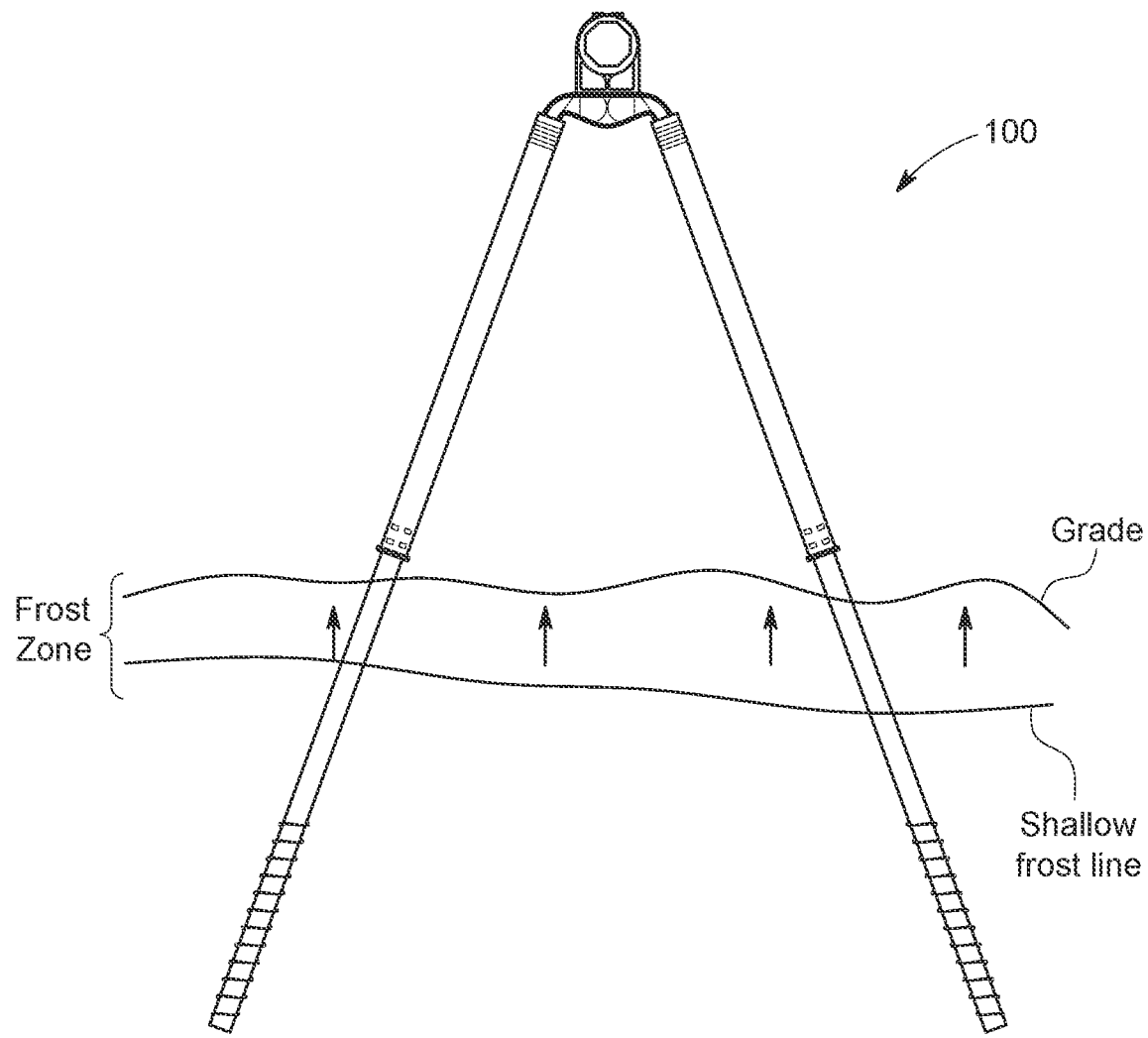
FIG. 3 shows a truss foundation according to various embodiments of the invention installed in a region with a shallow frost zone.

As discussed in the background, in colder, Northern environments, truss foundations with angled truss legs that extend below ground may be more prone to failure than plumb-driven monopiles. To that end, FIG. 3, shows a truss foundation for use in regions with a relatively shallow frost zone. The arrows in this figure between the frost line and grade illustrate the problem of frost heave. Frost heave occurs when subsurface moisture and/or water in the soil in the frost zone freezes, causing an uplifting effect on the surrounding soil. So-called ice lenses form in this zone and can attach to foundation components, causing movement and even failure of the systems they support. Extending foundations below the frost line does not necessarily ensure that the supported structure will be prevented from frost heaving. Movement in the soil resulting from ice lens growth can be transmitted to foundation components if the ice freezes to them, even when a portion of the component extends below the frost zone. This phenomena can be particular acute where the columns or foundation components are oriented at non-plumb angles. In such cases, upward frost heave applies a non-axial adfreeze moment to the components that must be resisted.

In the example of FIG. 3, truss foundation 100 is anchored well below the frost line with very little of the truss legs passing through the frost zone. Because the upward force of frost heave is proportional to the amount of surface area of the foundation in affected zone, the adfreeze moment here will be relatively small and can be resisted with deep embedment depths and, if necessary, larger diameter anchors.

Figure 4:
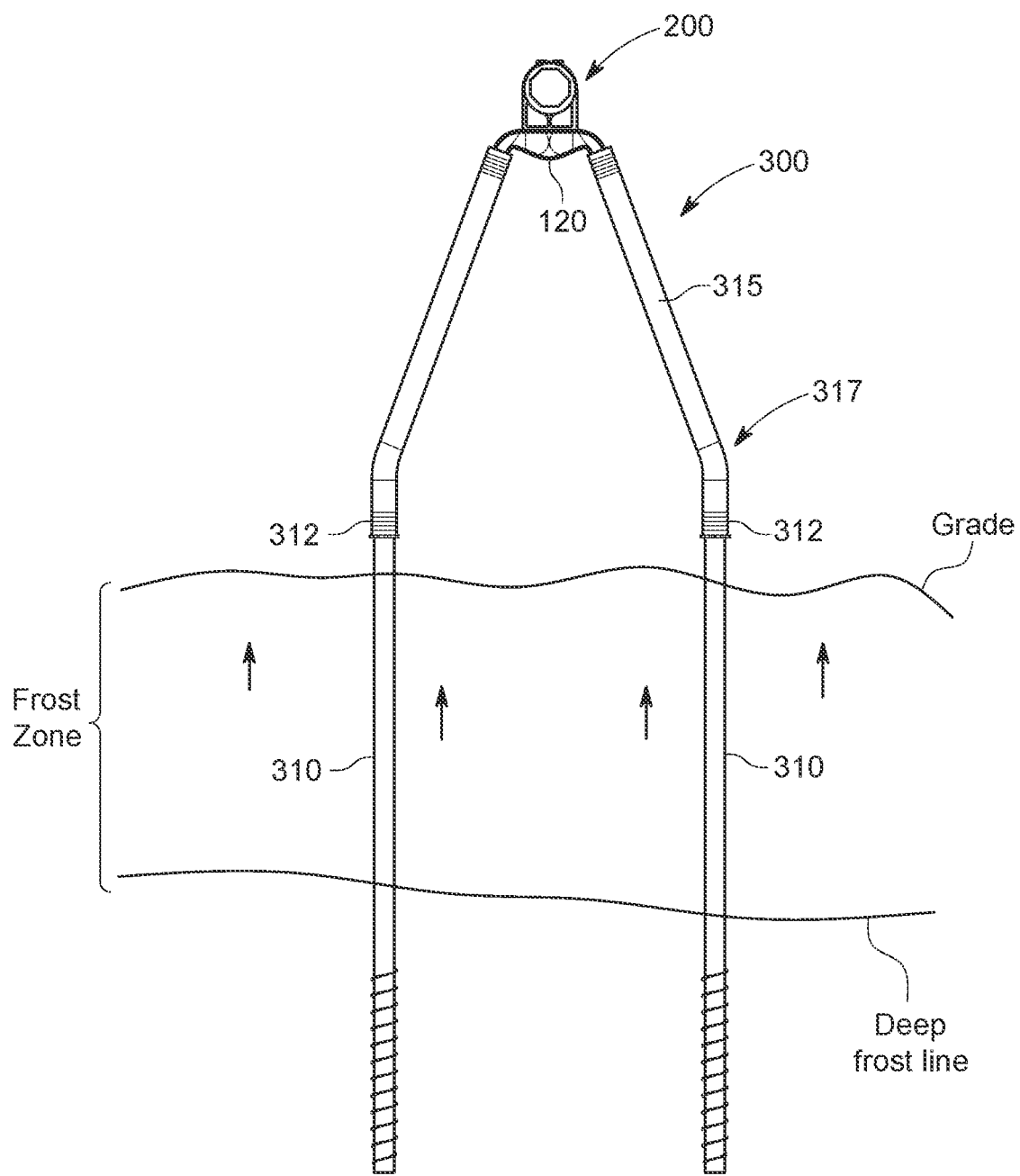
FIG. 4 shows a truss foundation according to various embodiments of the invention installed in a region with a deep frost zone.

By contrast, in the example of FIG. 4, the frost zone is much larger. In this case, most of screw anchor 310 is exposed in the frost zone. As a result, the adfreeze moment has the potential to be too large for the sub-frost zone portion of the foundation to resist. In order to compensate for this, truss legs 310 of foundation 300 have been driven into the ground so as to be substantially plumb, and therefore aligned with the direction of heave. This does not eliminate adfreeze but does eliminate the adfreeze moment and therefore will not expose the screw anchors to non-axial forces. In order to utilize standard truss components, such as truss cap 120, upper leg sections 315 of truss 300 have been modified to include elbow portion 317 proximate to their lower end where they change from being angled toward the truss cap to being plumb to match the geometry of driven screw anchors 310. In various embodiments, upper legs 315 are pre-bent to the appropriate angle to interface between connecting portions 122 of truss cap 120 and coupler 312 at the top of plumb screw anchors 310. When frost heave and adfreeze occur here, the forces felt on screw anchors 310 are substantially axial. Because individual structural members are relatively good at resisting axial forces, truss foundation 300 is much better able to remain intact in the face of frost heave and adfreeze than foundation 100 in FIG. 3.

Figure 5:
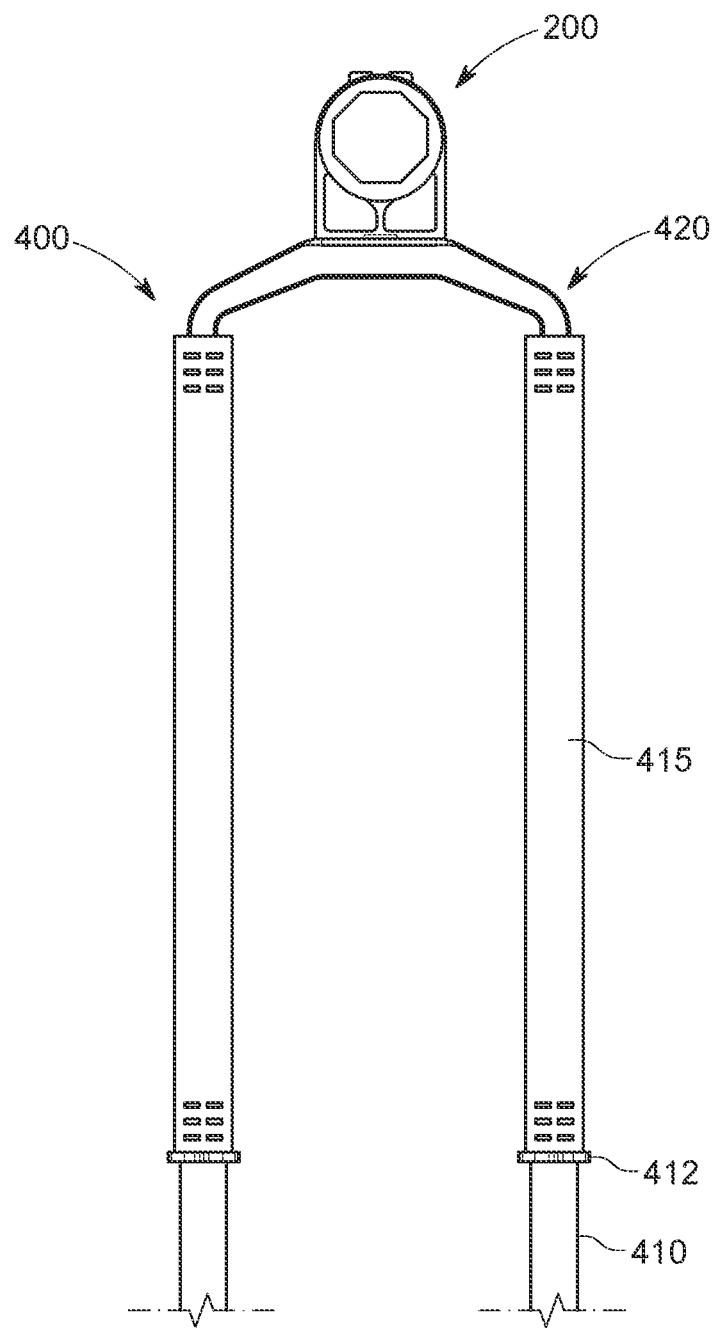
FIG. 5 is a front view of a truss foundation for frost heave environments according to various embodiments of the invention.
Figure 6A:
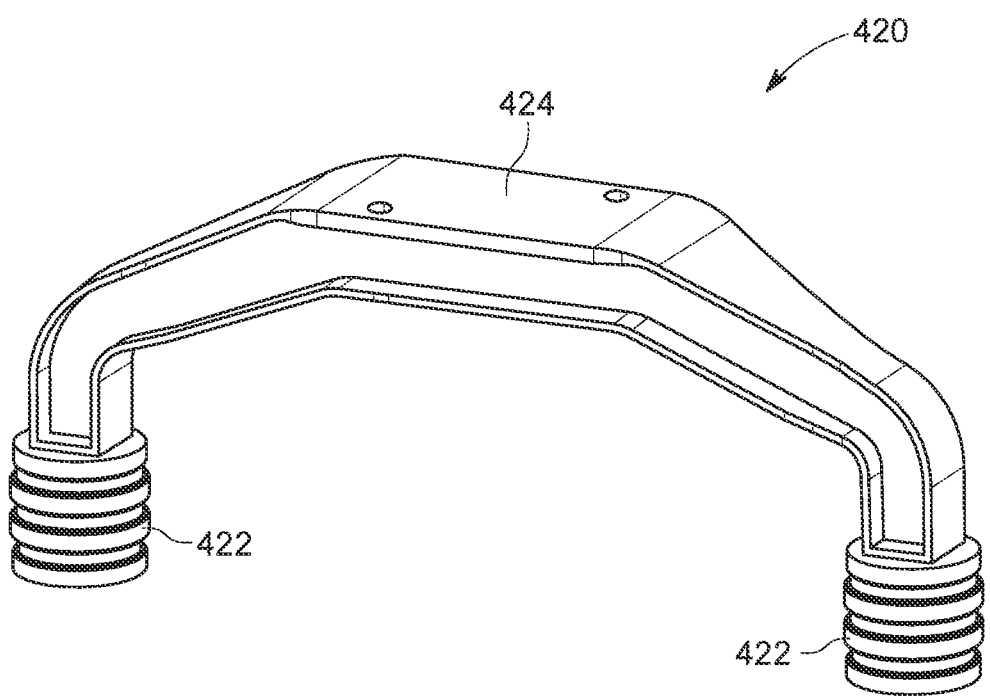
FIGS. 6A-C are perspective, side, and front views respectively of a truss cap for use with the truss foundation of FIG. 5 according to various embodiments of the invention.
Figure 6B:
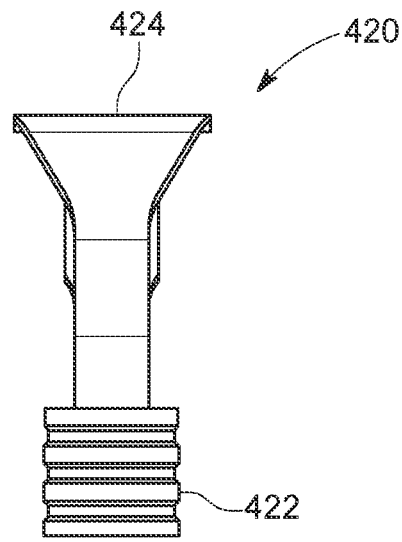
Figure 6C:
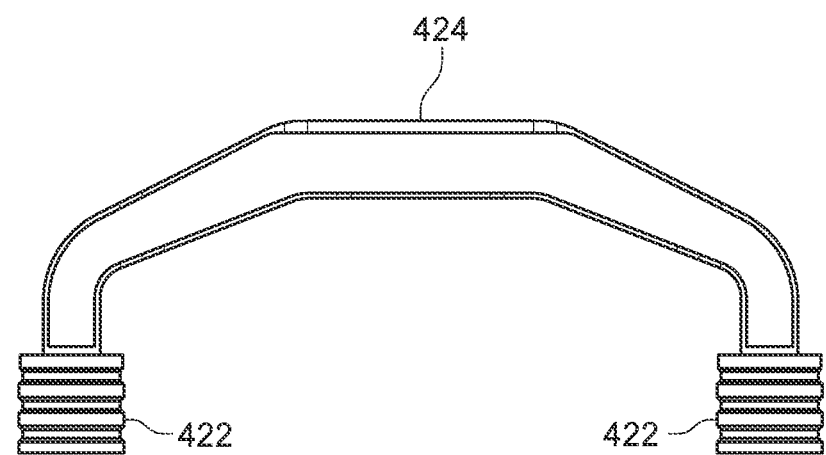

Turning now to FIG. 5, this figure shows truss foundation 400 which is particularly well suited to frost heave applications in accordance with various embodiments of the invention. FIGS. 6A-6C show various views of truss cap 420 used in truss foundation 400. Once again, foundation 400 is built on a pair of adjacent, plumb-driven screw anchors 410. Though not shown, in various embodiments, screw anchors are driven into the ground so that they extend well below the frost line. In this case, upper leg portions 415 are not pre-bent but instead substantially extend the axis of screw anchors 410. Truss cap 420 at the apex of truss 400 has a wider stance than truss cap 120 to accommodate the spacing between plumb oriented upper legs. In this example screw anchors 410 and upper leg portions 415 of each truss leg are substantially parallel to one another and separated by a distance of less than 1 meter (e.g., ~2-feet). Truss cap 420 has a handle shape with a pair of angled arms that terminate in downward projecting connecting portions 422 and meet centrally about elevated mounting platform 424. In various embodiments, a bearing assembly, tracker motor, or other tracker component is attached to mounting surface 424. Like truss cap 120, truss cap 420 may be made from a single casting.

Figure 7A:
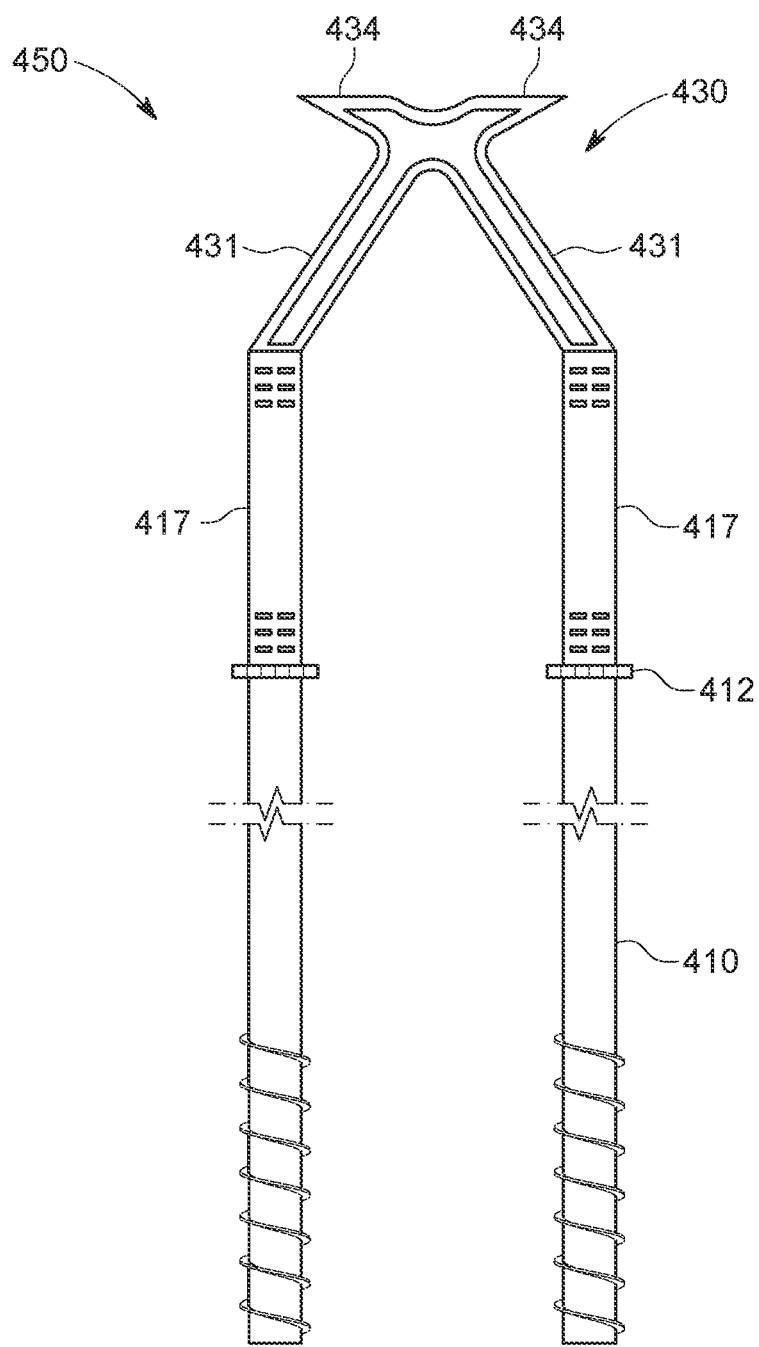
FIG. 7A shows another truss foundation for frost heave environments according to various embodiments of the invention.
Figure 7B:
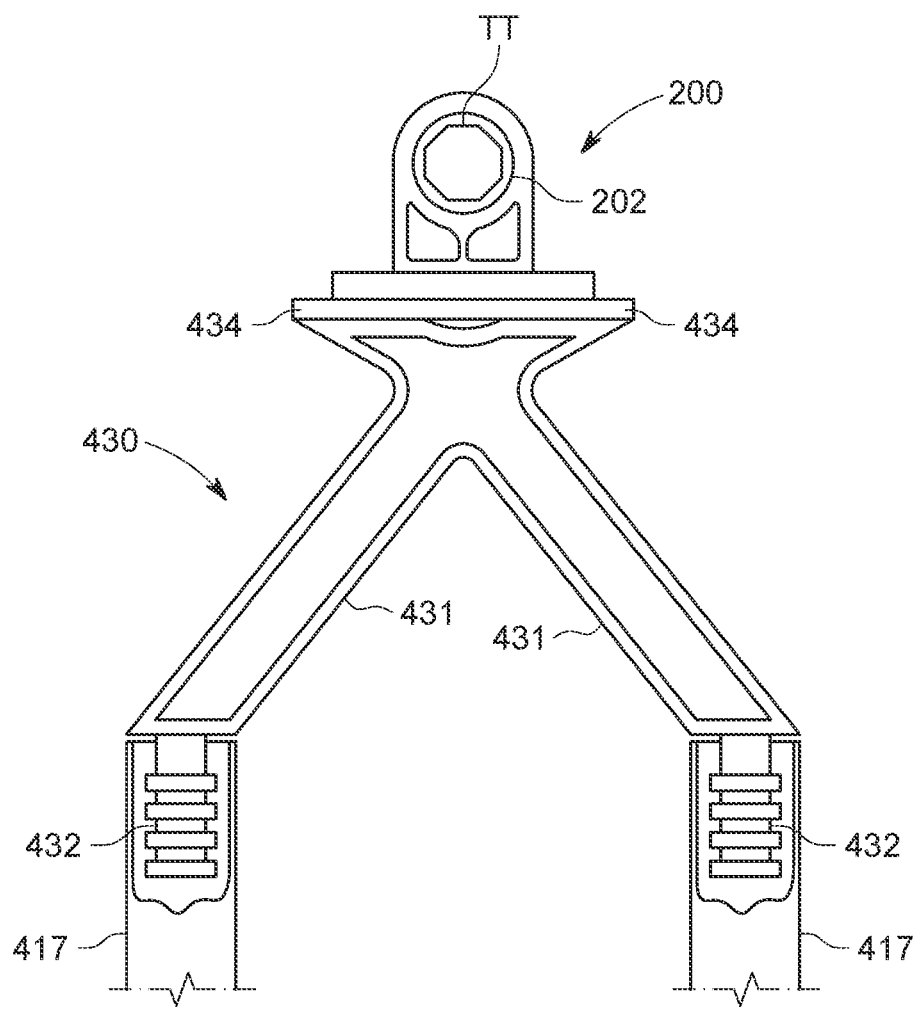
FIG. 7B shows a portion of the truss foundation of FIG. 7A supporting a tracker bearing assembly.
Figure 8:
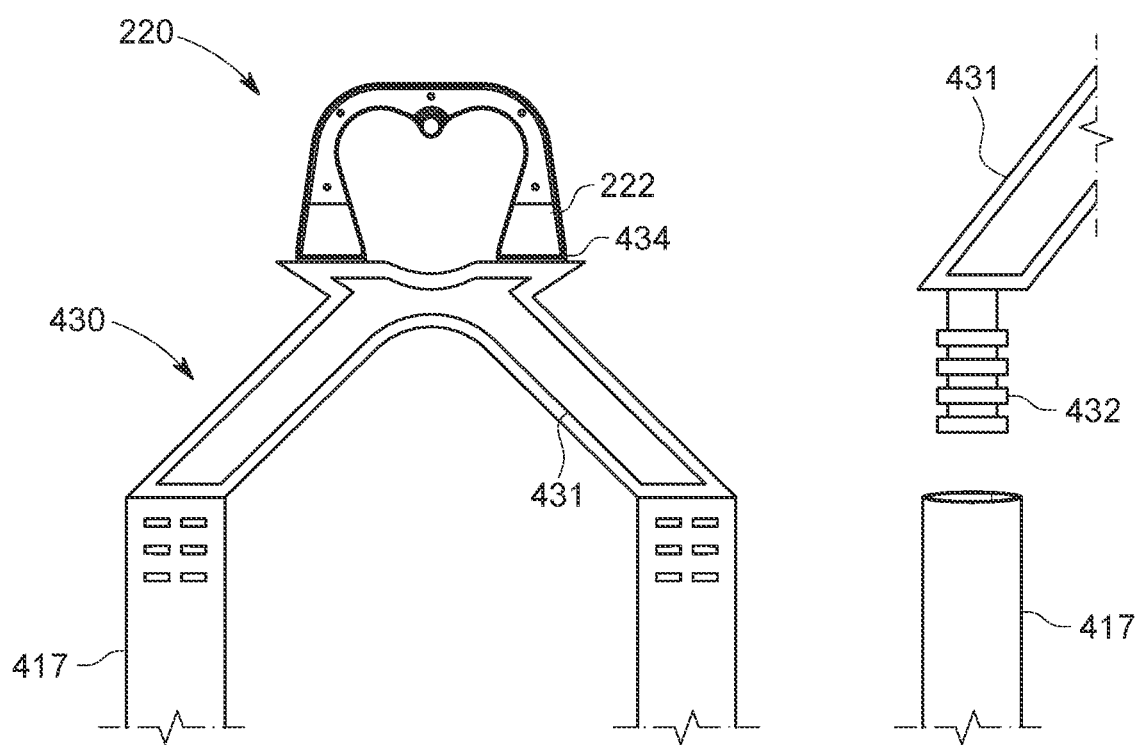
FIG. 8 shows a portion of the truss foundation of FIG. 7A supporting a bearing housing assembly.

FIGS. 7A, 7B, and 8 show another truss foundation for resisting frost heave forces according to various embodiments of the invention. FIG. 7A shows completed truss foundation 450, FIG. 7B shows foundation 450 with ATI bearing assembly 200 and FIG. 8 shows foundation 450 with NEXTracker BHA 220. Starting with 7A, foundation 450, like other foundations shown and discussed herein, consists of a pair of two-piece plumb-oriented truss legs joined together with truss cap 430. Truss cap 430 according to this embodiment, has a 4-pronged star shape with two lower arms 431 extending from the center at angles to one another and terminating in connecting portions 432. In various embodiments, these connecting portions 432 are received in upper leg sections 417 like the connecting portions of other truss caps discussed herein. Where they meet the truss legs, they have coupler portions extending vertically that are received within the upper ends of each leg. See, for example, FIGS. 7B and 8. In various embodiments, upper legs portions 417 are crimped where they overlap these connecting portions 432 as well as at the point of overlap with driving couplers 412.

As shown, truss cap 430 also has a pair of smaller upper arms that extend up and outward terminating in horizontal mounting platforms 434 to support a bearing assembly or bearing housing assembly (BHA) such as that shown in FIGS. 7B and 8, respectively. Starting with FIG. 7B, this figure shows bearing assembly 200 of a conventional tracker such as the ATI DuraTrack HZ tracker discussed herein attached to truss cap 430. In such a tracker, torque tube TT is contained within bearing assembly 200, in some cases surrounded by a bearing insert, and is able to rotate about its own axis to change the angle of the attached solar panels.

Assembly of truss 450 is accomplished in the same way as with other trusses discussed herein with a pair of adjacent screw anchors driven to be plumb on either side of an intended North-South oriented tracker row. In various embodiment, anchors are long enough so as to be driven to an embedment depth that enables the external thread for the anchor to penetrate below the frost line of the soil. Truss cap 430 is held in place using a jig or holder on the machine used to drive the screw anchors and upper legs 417 are sleeved over connecting portions 432 and then down onto coupler 412. All over lapping areas of upper leg 417 are then crimped to secure the truss's orientation.

FIG. 8 shows truss cap 430 supporting NEXTracker BHA 220. Legs 222 sit on support portions 434 Corp. of Fremont, CA. NEXTracker's single-axis tracker is a top down or so-called mechanically balanced tracker where the torque tube hangs from a pin through their bearing housing assembly and swings through an arc that is bounded by the bearing housing assembly. A torque tube bracket is attached to the pin and to the torque tube. The drive motor in this tracker is offset so that its axis of rotation is aligned with the bearing pin rather than with the torque tube. The tube curves up on either side of the motor to pass through the slewing drive's gear assembly. According to NEXTracker, this configuration is mechanically balanced so that there are no overturning moments regardless of the angle of the panels.

It should be appreciated that the foundation 450 shown in FIGS. 7A-B and 8 may also support a tracker motor such as a slewing tracker motor that drivers a circular gear box in both top-down (mechanically balanced trackers) and conventional bottom up-trackers. Foundation 450 may also be used to support a center structure that turns the torque tube and transfers power across multiple rows, such as that used in the ATI tracker. It should be appreciated that any of the foundations disclosed herein may be useful for supporting tracker drive motors, drive assemblies, outer tracker rows or any other rows that may be subjected to more moments relative to the foundations supporting the inner tracker rows and/or bearings. These foundations may be used to support other structures as well.

Figure 9:
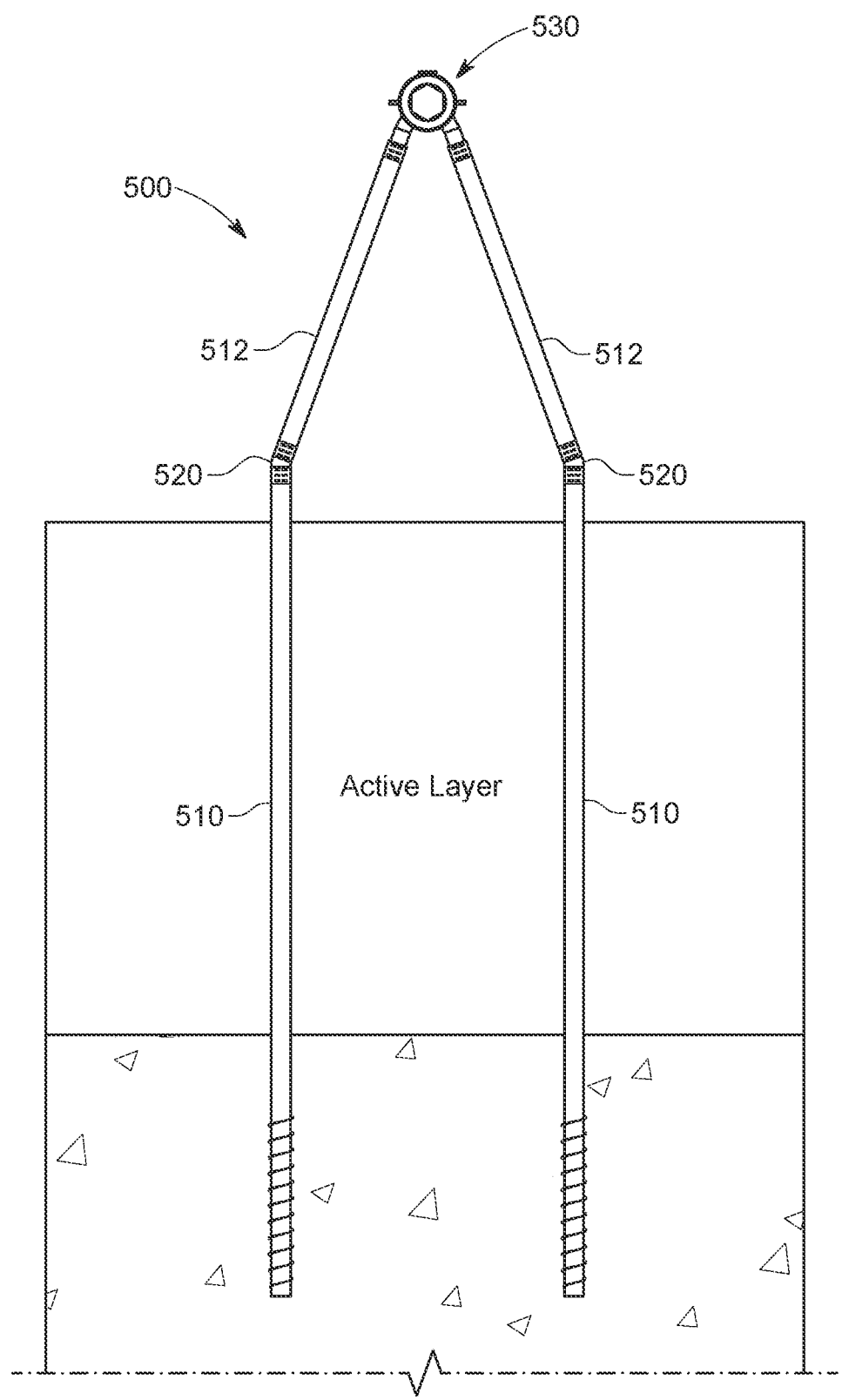
FIG. 9 shows a further truss foundation for frost heave environments according to various exemplary embodiments.

Turning now to FIG. 9, this figure shows a further truss foundation 500 for frost heave environments according to various exemplary embodiments. Foundation 500, as shown in the exemplary figure, consists of a pair of plumb driven screw anchors 510 that are embedded below the active layer of the soil. The active layer may be the depth subject to frost heave, or alternatively, consist of expansive clay. Above ground, a pair of upper leg sections 512 are joined to the screw anchors by elbow couplers 520. Truss foundation 500 terminates in so-called bearing adapter 530. In the context of this disclosure, a bearing adapter combines the functionality of a truss adapter or truss cap to join the upper leg sections to form a unified truss foundation as well as providing an integrated tracker bearing to rotatably receive a section of the tracker torque tube. These components are shown in greater detail in the exploded view of FIG. 10 and in FIG. 11.

Figure 10:
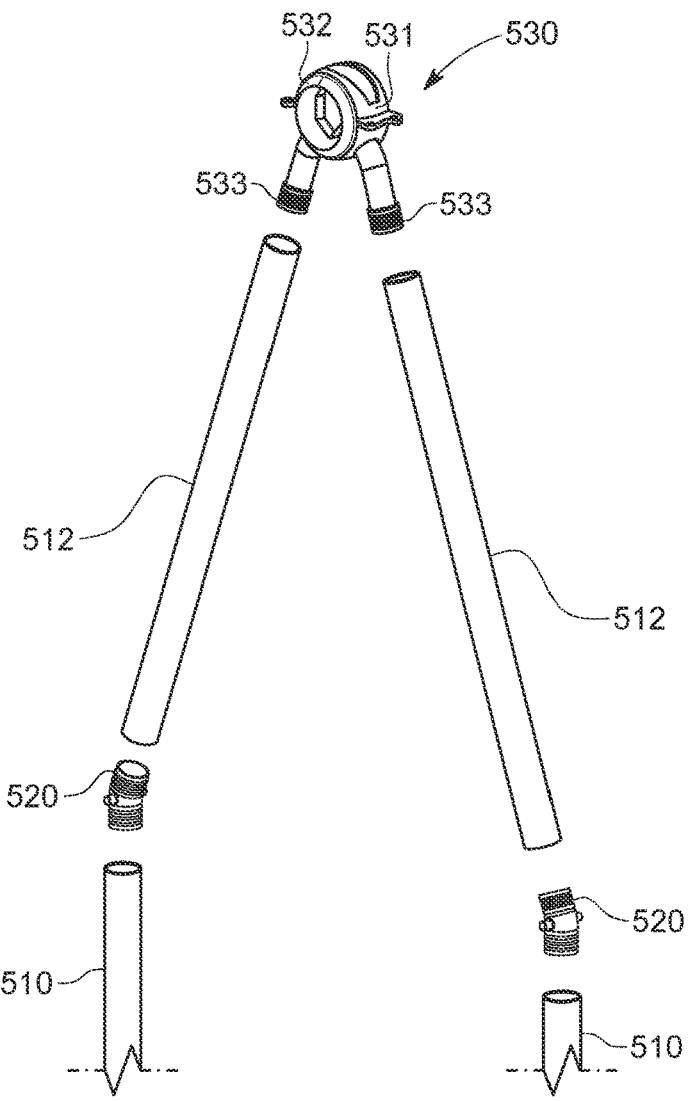
FIG. 10 shows components of the exemplary truss foundation for frost heave environments shown in FIG. 9.
Figure 11:
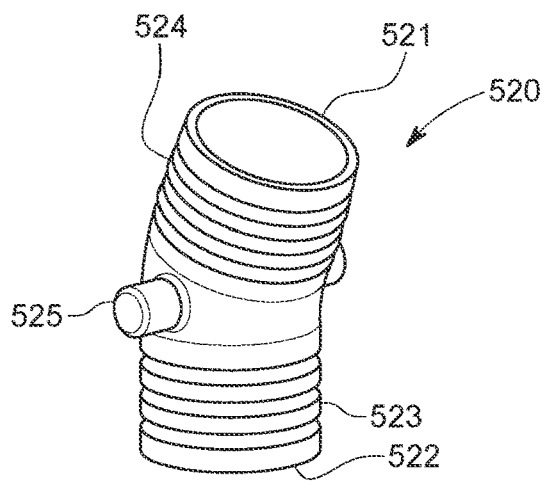
FIG. 11 shows an exemplary elbow crimp coupler according to various embodiments of the invention.

In the exemplary illustration of FIG. 10, the upper driving details of screw anchors 11 have been omitted. In various embodiments, a ring of driving teeth or other features may be welded to the upper end of each anchor, such as, for example, driving ring 511 shown in FIG. 12. Ring 511 is show as symmetric, that is, each tooth is the same size, however, in other embodiments, the teeth on the ring may take on different shapes to enable the installation machine to know the orientation of the screw anchor relative to holes or other features on it as discussed in greater detail in the context of FIG. 25. Elbow coupler 510 has a lower end 522 and upper and upper end 521. Each end 521, 522 has a set of channels 523, 524 respectively that provide voids for crimping into. When the truss is assembled, the lower ends of each upper leg portion 512 are sleeved over the channels in connecting portion 524 524 while channels of connecting portion 523 523 of lower end 522 are dropped into one of the driven screw anchors. Features 525 limit the depth of penetration of coupler 520 into the screw anchor but also provide a registration point for a crimper so that the jaws of the crimper align with the channels regardless of the orientation of the upper leg to provide space for it to deform into regardless of the depth or position the upper leg section 512. It should be appreciated that although features 525 are shown as rounded projections they may take on other geometries without departing from the spirit or scope of the various embodiments of the invention. Lower end 522 and upper end 521 are oriented at angles to another to enable plumb driven screw anchors to be joined to angled truss legs. An axis through the center of the upper end 521 and lower end 522 may be separated, for example by approximately 20-degrees so that when coupler 520 is inserted into a driven screw anchor, upper connecting portion 524 makes an angle of approximately 70-degrees with respect to horizontal. At the upper end, upper leg sections 512 are sleeved over connecting portions 533 of bearing adapter 530 so that crimp joints may be affected there as well where the upper leg section overlaps with the bearing adapter.

As shown in the figures, bearing adapter 530 has a bearing insert 532 that adapts the cross section of the torque tube to the bearing opening although other designs may be used to accommodate different trackers. As shown, a two-piece body 531 clamps together to secure the bearing insert. Stops formed in bearing insert 532 may extend out of the opening of top half of bearing 530 to prevent over rotation of the torque tube.

FIGS. 13A and 13B show different views of a multi-legged motor truss foundation 550 according to various embodiments of the invention. In the example shown, four screw anchors 510 are used to support the tracker drive motor 600. Four upper leg sections 512 are attached to the screw anchors via elbow couplers 520. In this example, the truss legs are joined together via pan shaped truss adapter 560. Motor drive assembly 600 sits on pan shaped truss adapter 560 with a convex base that enables its orientation to be adjusted relative to the adapter. In various embodiments, screw anchors 510 may be driven in East-West and North-South orientations, that is, straddling the tracker row and along the direction of it to enable the legs to resist lateral loads as well as loads along the torque tube. Alternatively, the four screw anchors may be driven in an X pattern crossing the tracker row at 45-degree angles when viewed from overhead.

Figure 14:
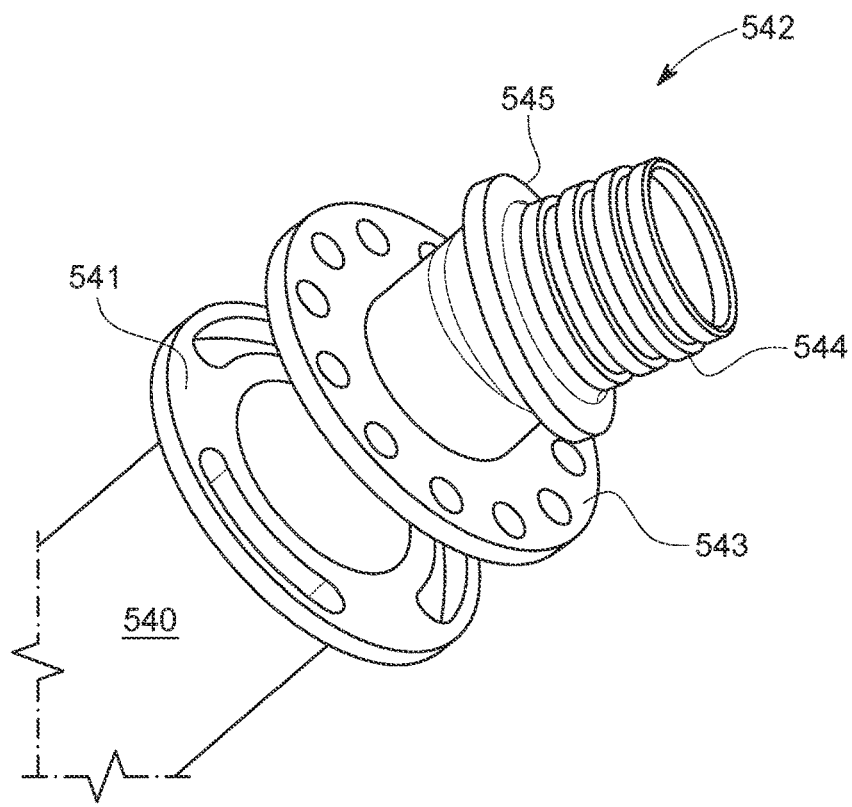
FIG. 14 shows an exemplary flanged elbow crimp coupler according to various embodiments of the invention.

Remaining FIGS. 14-26 show various elbow couplers usable with truss foundations having plumb driven below ground components according to the various embodiments of the invention. Starting with FIG. 14, this figure shows a flange type of coupler 542. In this example, screw anchor 540 has a flange-shaped head 541 that mates with flange 543 of coupler 542. In various embodiments, flange 541 may be used to drive the screw anchor into the ground, mating with reciprocal features of the chuck of a rotary driver on the anchor installation machine. Flange 543 may be fixed to flange 541 using bolts, rivets or other suitable fasteners. This flange-on-flange fitment allows coupler 542 to be rotated as needed so that it points at the intended location of the apex of the truss to enable the truss to be correctly assembled. Connecting portion 544 is received in a lower end of one of the upper legs so that these two components may be crimped together where they overlap. Ring 545 at the base of connecting portion 544 limits the depth of penetration, provides a pivot point to adjust the orientation of the upper leg, and also may provide a registration point to orient the crimper with respect to the channels formed in the connecting portion so that the blind crimp is successfully achieved every time regardless of the upper leg's position or orientation.

Figure 15:
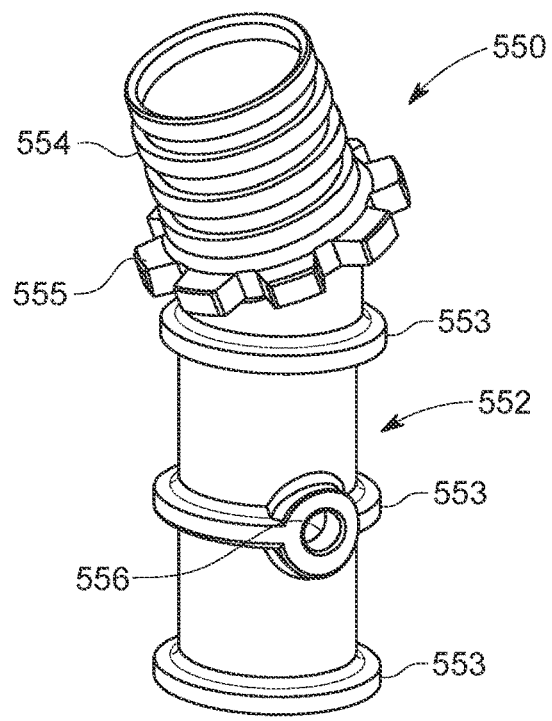
FIG. 15 shows an exemplary elbow crimp coupler insert according to various embodiments of the invention.

FIG. 15 shows another elbow coupler 550 according to various exemplary embodiments of the invention. Coupler 550 has a reinforced insert section 552 that is inserted into the upper end of a driven screw anchor. Bolt hole 556 receives a bolt that passes through both the screw anchor and the coupler. Rings 553 prevent the coupler from wobbling within the screw anchor. The upper portion of coupler 550 has a connecting portion 554 with ring 555. It should be appreciated that ring 555 need not have teeth because coupler 542 is not used to drive the screw anchor but rather is added after the screw anchor is driven. As in other embodiments, connecting portion 544 is received within the lower end of one of the upper leg portions and a crimp connection secures the upper leg to the coupler. Connecting portion 554 is angled at the appropriate leg angle for the truss cap or truss adapter, for example, 20-degrees from the lower portion. Though not shown in the figure, the screw anchor must have a pair of matching holes formed in it to allow the bolt to pass through it and holes 556 of coupler 550.

Figure 16A:
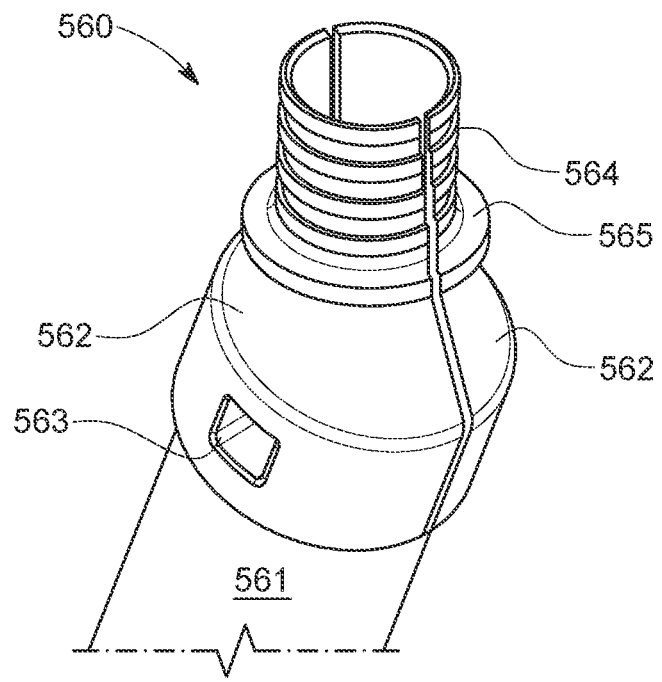
FIGS. 16A and 16B are perspective and side views respectively of an exemplary two-piece elbow coupler according to various embodiments of the invention.
Figure 16B:
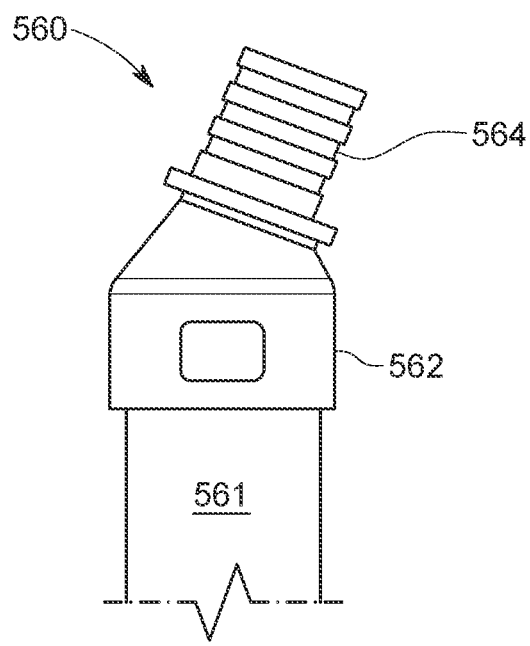

In some cases, it may be advantageous for the elbow coupler to be made of two-piece construction. To that end, turning now to FIGS. 16, 17 and 18, these figures show additional two-piece elbow couplers according to various embodiments of the invention. Beginning with FIGS. 16A and 16B, these figures show two-piece elbow coupler 560. Coupler 560 consists of two halves that are joined together to fit over the head of a screw anchor 561. The screw anchor may have a pair of notches or holes cut in it like holes 622 formed in anchor 621 shown in FIG. 21C. Halves 562 of coupler 560 are fitted over the driven screw anchor so that holes 563 align with the holes formed in the screw anchor. Then, a bolt (not shown) or other fastener is passed through the holes 563 and the anchor to secure the halves together over the upper end of the screw anchor. The machine driving the screw anchors will rotate when driving it so that the holes are clocked to the correct position so that when holes 563 are aligned with the driven screw anchor, connecting portions 564 will point at the correct location in free space to enable the upper legs and truss cap or bearing adapter to be assembled. Ring 565 acts as a stop and pivot point for the upper leg section when it is fitted over the connecting portions 564. When the upper leg section is crimped around the connecting portion, it will further unify the two-halves of coupler 560. FIG. 16B shows the assembled coupler from the side (looking North or South) along the tracker row.

Figure 17A:
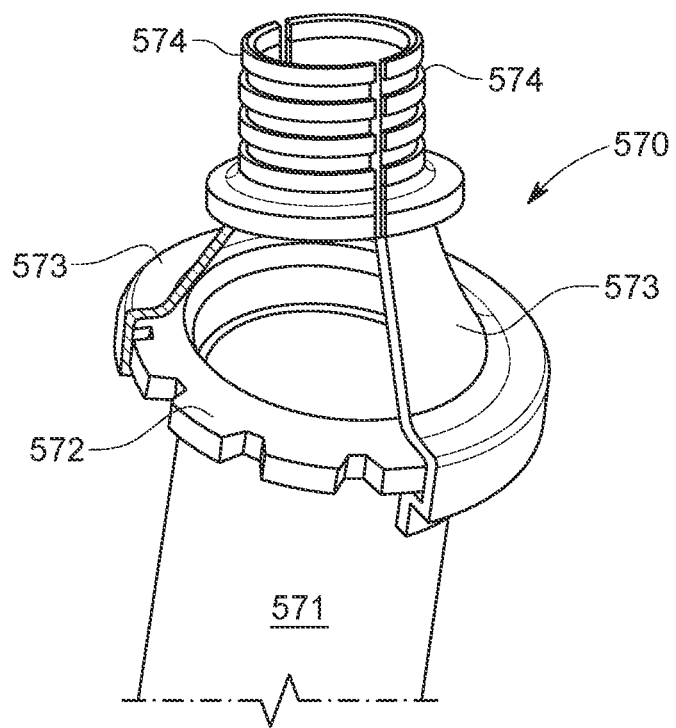
FIGS. 17A and 17B are perspective and side views respectively of another exemplary two-piece elbow coupler according to various embodiments of the invention.
Figure 17B:
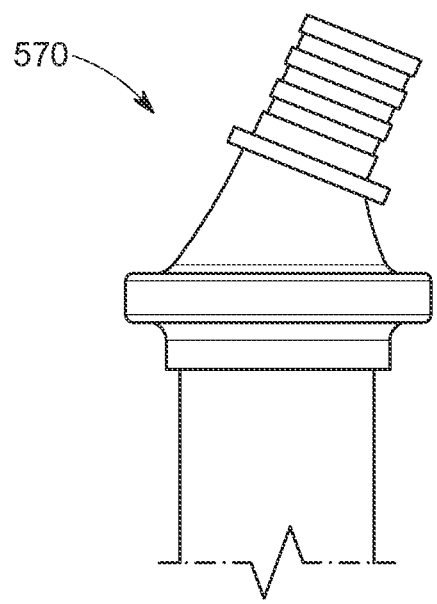
Figure 18A:
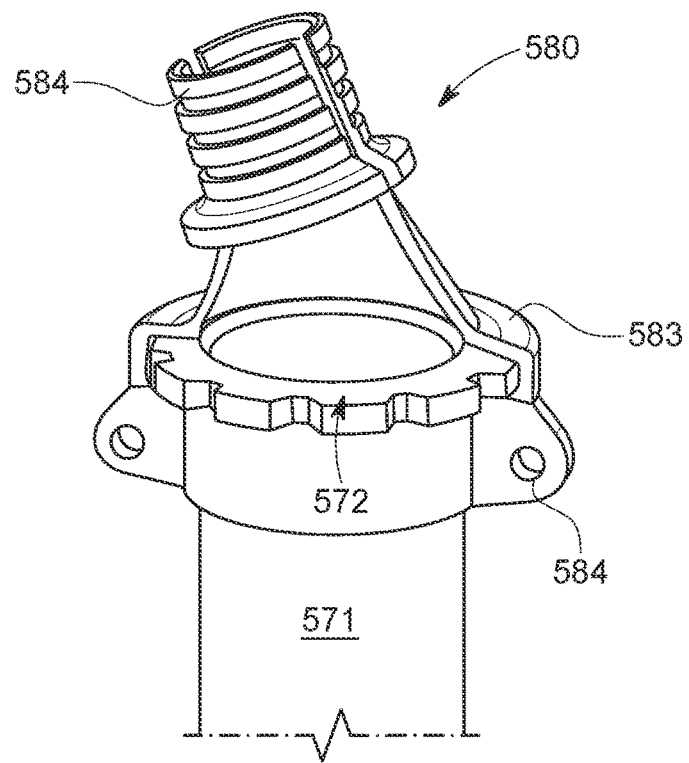
FIGS. 18A and 18B are perspective and side views respectively of another exemplary two-piece elbow coupler according to various embodiments of the invention.
Figure 18B:
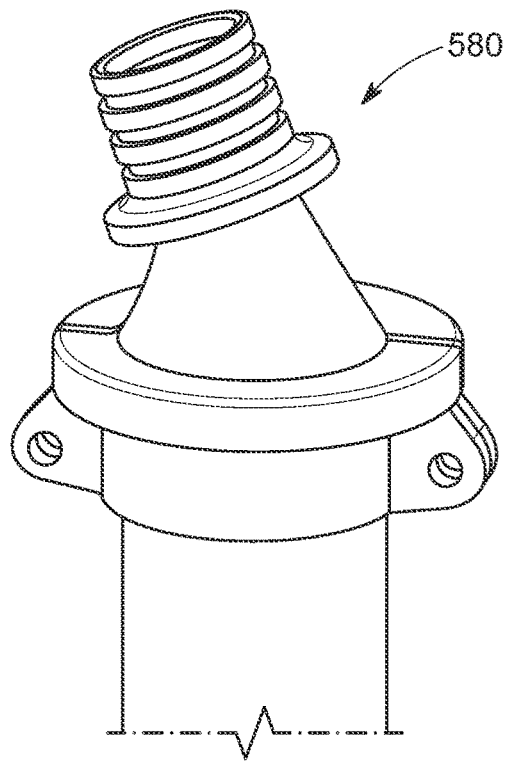

FIGS. 17A and B show another two-piece elbow-coupler 570. Couper 570 is made from two halves 573 that each fit around a driving ring such as ring 572 shown on screw anchor 571 in the figure. When coupled together, halves 573 terminate in connecting portions 574 that combine to form a single angled projection to receive the lower open end of one of the upper leg portions. A crimp joint over the upper leg section pinches the two halves 573 together to form a unified coupler and secures the upper leg portion to the driven screw anchor 571. FIGS. 18A and 18B show a variant of coupler 570 identified in the figures as coupler 580 that includes overlapping lower flanges in each half 573 with through holes 584 that enable bolts, rivets, or other fasteners to pass through to enable the two halves to be locked together before the upper leg portion is crimped to the connecting portions 584. In various embodiments, this may provide improved strength over coupler 570 due to the additional compressive strength provided by the bolts through each pair of overlapping flanges. Both coupler 580 and coupler 570 provide the advantage that the rotation of the screw anchor does not need to be clocked so that the position of the bolt holes in the top of the anchor will ensure that the elbow coupler is pointing at the correct point in free space to enable the truss foundation to be assembled. With other elbow couplers shown and discussed herein with holes cut or punched in them, the screw anchor must be rotated within a few degrees of the correct position for the reciprocal features of the anchor to align with the coupler at the correct orientation.

Figure 19A:
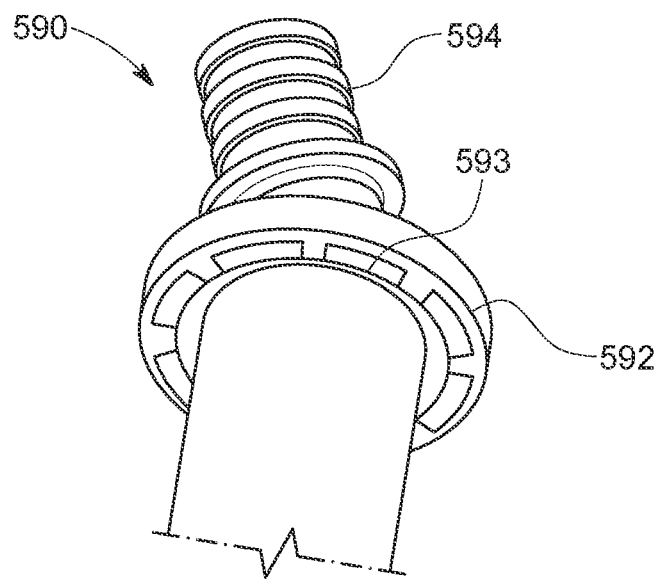
FIGS. 19A and 19B are bottom and top perspective views respectively of an exemplary one-piece elbow coupler according to various exemplary embodiments of the invention.
Figure 19B:
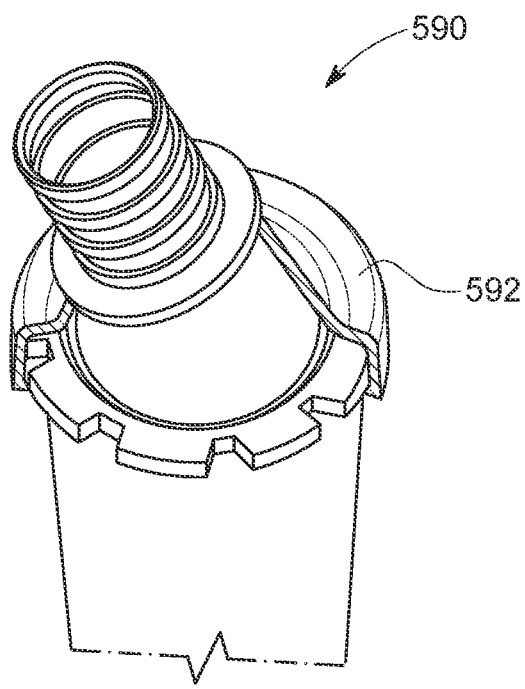

FIGS. 19A and B show still another variant of an elbow coupler 590 for truss foundations according to various other exemplary embodiments of the invention. Coupler 590 has a hood portion 592 that includes openings 593 spaced around its underside to enable it to receive the teeth of the driving ring when slide down over it. Once placed over the driving ring, the coupler is rotated a partial turn to lock it into place on the screw anchor. Then, upper leg portion is sleeved down over connecting portion 594 so that it may be crimped into place thereby locking the components together.

Figure 20:
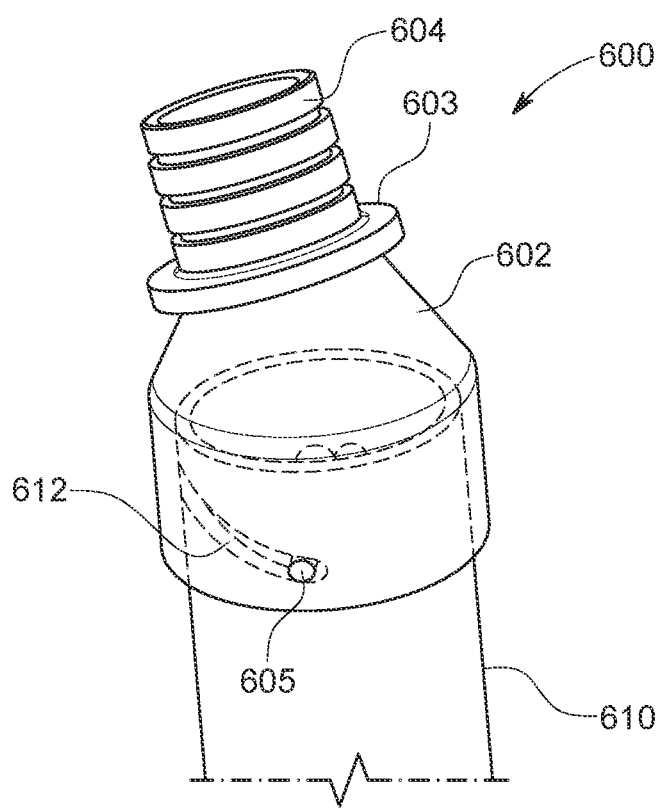
FIG. 20 is a side view of another exemplary one-piece elbow coupler according to various embodiments of the invention.

FIG. 20 shows another elbow coupler 600 according to various embodiments of the invention. Coupler 600 is a one-piece coupler with a main housing portion 602 that is open at the lower end. As shown, projection 605 is formed on the inside wall of housing 602. That projection is a received in a corresponding slot 612 formed in the head of screw anchor 610. Coupler 600 is fitted over the upper end of screw anchor 610 and twisted allowing it to slide down onto the screw anchor as projection 605 moves down along slot 612. At the upper end, connecting portion 604 includes several crimp channels and a ring 603 to limit the extent of penetration when an upper leg portion is sleeved down onto the coupler. A coupler such as coupler 600 will require the position of the slot to be known to the installation machine when driving it into the ground so that when the coupler is fitted to the head of the screw anchor, and fully twisted down onto it connecting portion 604 will point at the correct location in free space to assemble the truss foundation. It should be appreciated that although a single projection 605 is shown in the figure, in various embodiments, two or more projections may be used requiring two or more channels formed in the upper end of the screw anchor.

Figure 23A:
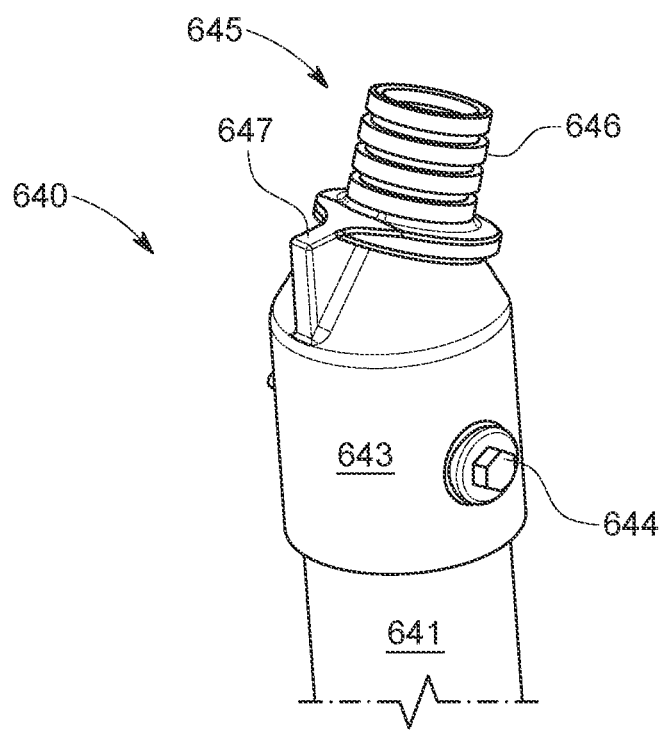
FIGS. 23A and 23B are alternating side views of still another exemplary one-piece elbow coupler according to various embodiments of the invention.
Figure 23B:
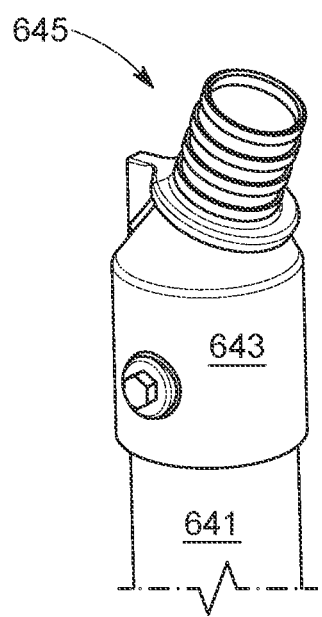
Figure 24A:
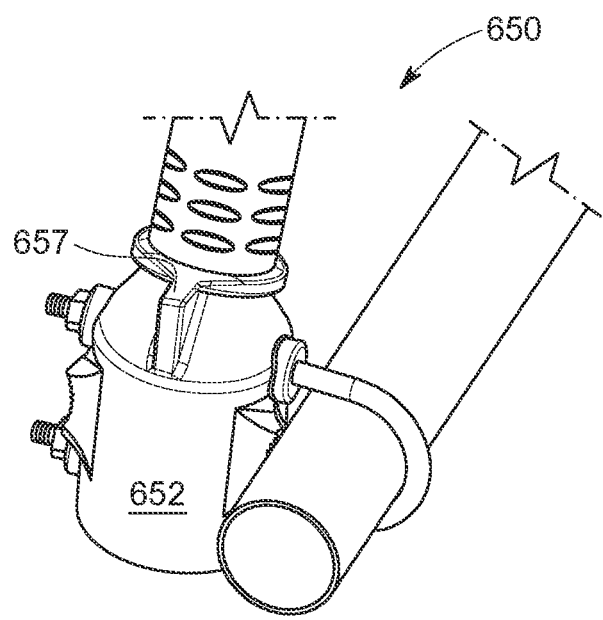
FIGS. 24A and 24B are alternating perspective views of a further one-piece elbow coupler with brace bracket according to various embodiments of the invention.
Figure 24B:
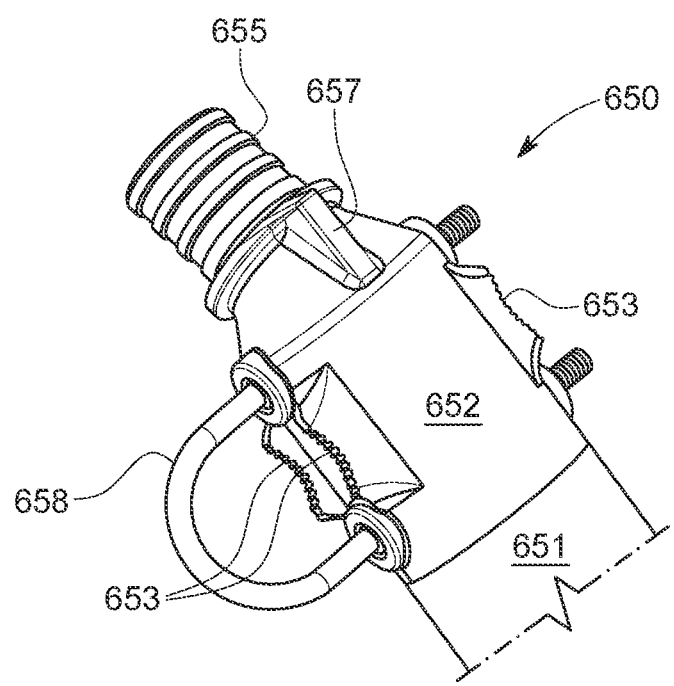

FIGS. 21A and 21B show yet another elbow coupler 620 for truss foundations according to various exemplary embodiments of the invention; FIG. 21C shows a screw anchor usable with such a coupler. Coupler 620 is similar to other couplers shown and described herein. It has a double-walled housing 623 that fits over the upper end of screw anchor 621 but also inside of it via inner portion 624. Bolt 623 passes through holes 622 formed in the upper end of the screw anchor and is secured with a nut. Upper connecting portion 626 includes a plurality of crimp channels and stop ring 628. FIGS. 23A and 23B show a variant of coupler 620 that includes impact surface 647 below connecting portion 646 for beating on it with a blunt tool such as a hammer to force housing 643 down onto the upper end of screw anchor 641. Bolt 644 passes through both pieces to lock the coupler to the screw anchor at the desired orientation. FIGS. 24A and 24B show coupler 650 according to a further variant. Couple 650 includes leg brace mounts 653 on opposing sides of the surface of housing 652 for supporting a leg brace. At certain foundation locations where the forces are greater relative to other locations (e.g., trusses along the perimeter of the array, motor trusses, etc.), it may be necessary to include an additional leg brace connecting the coupler on the top of one screw anchor to the coupler on the adjacent screw anchor supporting the same truss. Leg brace mounts 653 shown in the figures have a semi-circular geometry with teeth to hold a leg brace interconnecting one coupler to the coupler on the adjacent screw anchor supporting the same truss. As pictured, U-bolt 658 passes though the housing and the upper leg 651 to secure the coupler to the screw anchor as well as the leg brace to the coupler. Elements 655 and 657 as shown are the same as elements 645 and 647 of FIGS. 23A and B.

Figure 25:
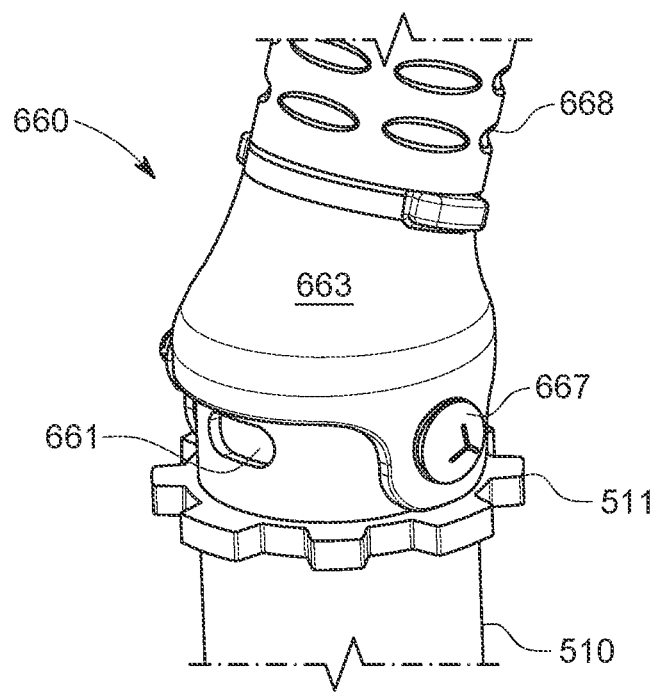
FIGS. 25 and 26 are in-use and isolation views of still another exemplary one-piece elbow coupler according to various embodiments of the invention.
Figure 26:
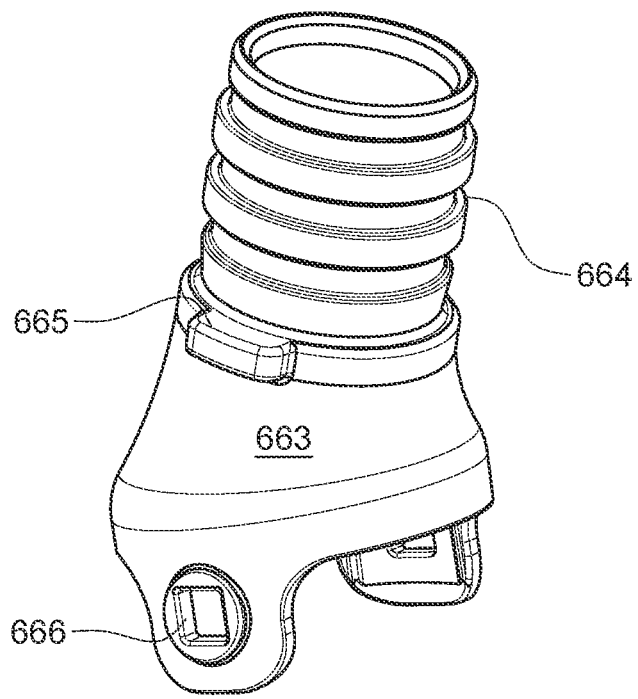

Turning now to FIGS. 25 and 26, these figures show another one-piece elbow coupler 663 according to various exemplary embodiments of the invention. Coupler 663 has a helmet shaped housing 663 with a pair of bolt holes 666 formed in opposing flanges. When mated to a screw anchor, such as anchor 510 shown in FIG. 25, bolt 667 passes through holes 666 in the coupler as well as through holes 661 in the upper end of screw anchor 510. As shown, screw anchor 510 has an asymmetric driving ring 511 that is used to drive the anchor into the ground. Connecting portion 664 has crimping rings formed in and projections 665 spaced around the base of connecting portion 664 act as a depth limiter as well as providing a feature to registered the crimper so that the jaws align with the channels formed in connecting portion 664 so that when blind crimp joints such as joints 668 are made, the upper leg section deforms into the channels regardless of the angular orientation of the upper leg with respect to the connecting portion.

Figure 22A:
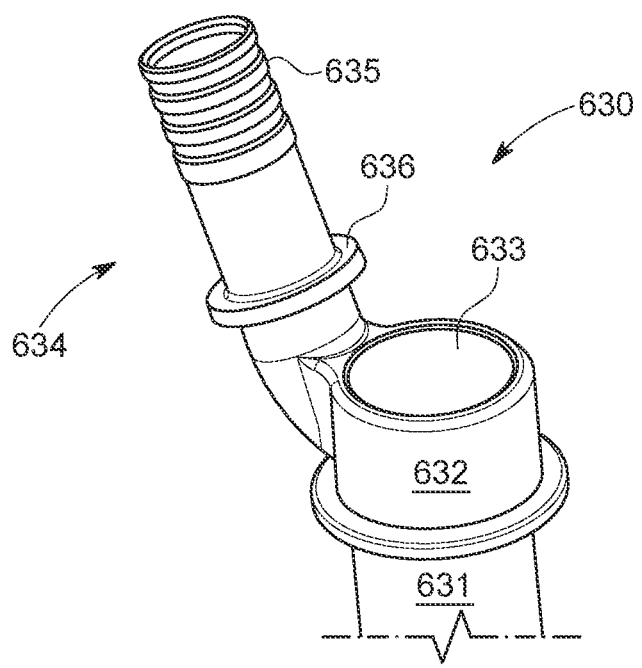
FIGS. 22A and 22B are top perspective and side views respectively of another exemplary one-piece elbow coupler according to various embodiments of the invention.
Figure 22B:
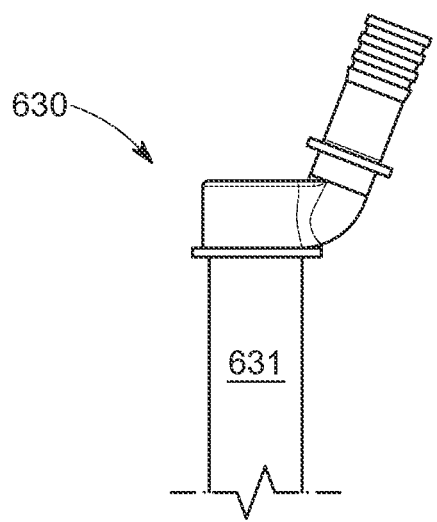

Unlike other embodiments shown and discussed herein, elbow coupler 630 shown in FIGS. 22A and 22B is fixedly attached to the head of screw anchor 631, that is, coupler 630 is attached to the head of anchor 631 when it is driven into the ground. The drilling tool on the installation machine driving the screw anchor passes through opening 633 at the top. This will require stopping the rotation of the screw anchor so that upper projection 634 with connecting portion 635 is pointing at the correct point in free space to enable the truss to be assembled. Stop ring 636 again acts as depth limiter and provides a pivot point to adjust the angle of the upper leg when joining the leg to the coupler.

Figure 27:
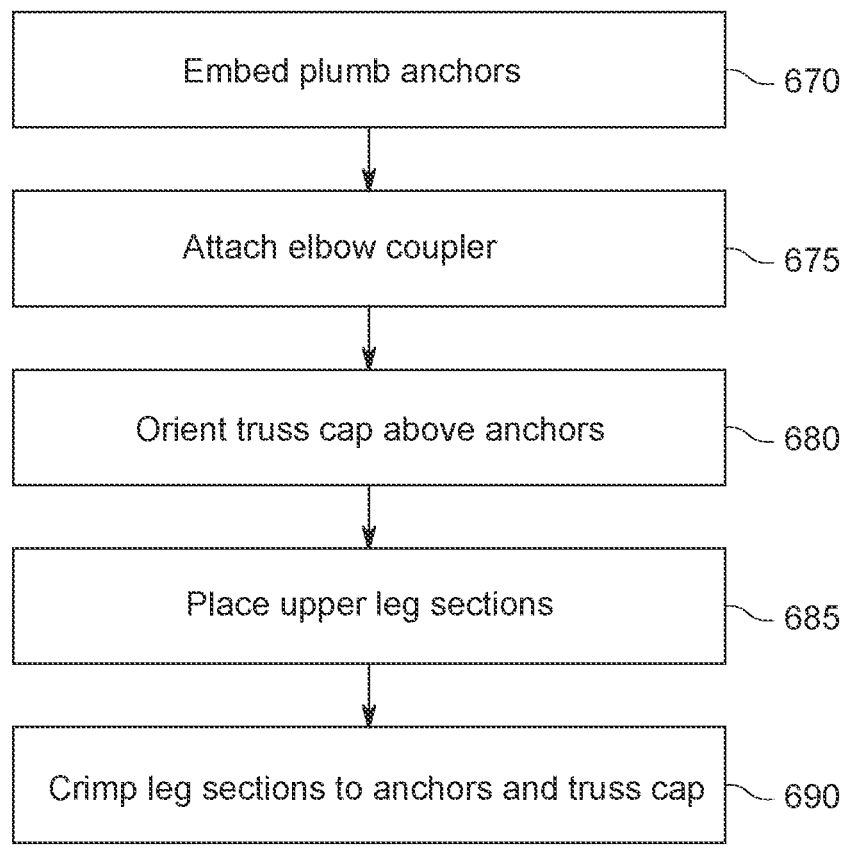
FIG. 27 is a flow chart detailing steps of an exemplary method for assembling a truss foundation for frost heave and other reactive soils according to various exemplary embodiments.

FIG. 27 is a flow chart detailing steps of an exemplary method of assembling a truss foundation according to various embodiments of the invention. The exemplary method begins in step 670 where a pair of adjacent screw anchors are embedded on either side of an intended tracker row. In various embodiments, this is done with a proprietary automated drilling and driving machine manufactured and sold by the applicant, OJJO, INC. of San Rafael, CA under the commercial name "TRUSS DRIVER." As discussed herein, the screw anchors are driven at a plumb orientation to extend below the active layer of the soil. When using elbow couplers that require a precise orientation of the screw anchor, the automated machine may keep track of the number of rotations required to embed the anchor so that the head of the driven anchor will present attachment features for the elbow coupler so that the coupler points at the correct location in free space to assemble the truss.

At step 675, if not already fixed to the screw anchor, an elbow coupler is attached to the top of each driven screw anchor. In various embodiments, this may be done by passing one or more bolts through each elbow coupler and screw anchor and securing them with a nut. Then, at step 680, the truss cap, bearing adapter or other apex component is held above the pair of driven screw anchors at the precise orientation. In various embodiments, the automated truss drive machine will self-orient a jig on the mast of the machine so that the apex truss component is held at the correct position above the pair of driven screw anchors. Next, at step 685 an operator places upper sections by sliding them up over connecting portions of the truss cap, bearing adapter, etc., and then down onto the connecting portion of the elbow coupler. Then, at step 690 a hydraulic crimping machine is then used to crimp the portions of each upper leg that overlap with the truss cap and the elbow coupler to unify the truss foundation at the correct orientation.

The embodiments of the present inventions are not to be limited in scope by the specific embodiments described herein. Indeed, various modifications of the embodiments of the present invention, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A truss foundation for a single-axis tracker comprising:
a pair of screw anchors, each anchor of the pair embedded into underlying ground at a substantially plumb orientation and terminating above ground in an elbow coupler, wherein each elbow coupler comprises a connecting portion extending at an angle relative to a central axis of the screw anchor;
a pair of upper leg sections, each joined at a first end to one of the elbow couplers to form a pair of bent truss legs; and
a truss cap having a pair of opposing connection portions received in a second end of respective ones of the upper leg sections, the truss cap having at least one planar mounting surface for supporting a tracker component.

2. The truss foundation according to claim 1, wherein the tracker component is selected from the group consisting of a tracker bearing, a tracker drive motor, and a tracker center structure assembly.

3. The truss foundation according to claim 1, wherein each screw anchor extends below an active soil layer of the underlying ground.

4. The truss foundation according to claim 3, wherein connections between the upper leg sections and the screw anchors and between the upper leg sections and the truss cap are crimp connections.

5. The truss foundation according to claim 1, wherein the elbow coupler comprises a feature for registering the position of a crimping device with respect to crimp features on a connecting portion of the elbow coupler.

6. A truss foundation for supporting a single-axis tracker above underlying ground comprising:
a pair of adjacent truss legs, each leg comprising a substantially plumb-driven screw anchor, an elbow coupler and an upper leg section that is oriented at an angle relative to the screw anchor via the elbow coupler; and
a truss cap joining open ends of each upper leg section, wherein the truss cap comprises a pair of connecting portions that are received in respective ones of the truss legs.

7. The truss foundation according to claim 6, wherein each substantially plumb-driven screw anchor extends below an active layer of the underlying ground.

8. The truss foundation according to claim 6, wherein the truss cap comprises at least one planar mounting surface for supporting a tracker component.

9. The truss foundation according to claim 8, wherein the tracker component is a component selected from the group consisting of a bearing assembly, a drive motor, and a center structure.

10. The truss foundation according to claim 6, wherein the truss cap comprises a bearing adapter.

11. A method of assembling a truss foundation comprising:
embedding a pair of adjacent screw anchors at a substantially plumb orientation;
attaching an elbow coupler to an upper end of each driven screw anchor;
orienting a truss cap above the pair of elbow couplers; and sleeving respective upper leg sections over connecting portions of the truss cap and over the connecting portion of one of the couplers while the truss cap is held at the correct orientation; and while maintaining the orientation of the truss cap, crimping portions of each upper leg that overlap with the truss cap and the elbow coupler.

12. The method according to claim 11, wherein attaching an elbow coupler to an upper end of each screw anchor comprises passing at least one bolt through the elbow coupler and screw anchor.

13. The method according to claim 11, wherein crimping the portions of each upper leg that overlaps with the elbow coupler comprises registering a crimping device with a feature on the elbow coupler.

* * * * *